US009696882B2

(12) United States Patent
Xiao et al.

(10) Patent No.: US 9,696,882 B2
(45) Date of Patent: Jul. 4, 2017

(54) OPERATION PROCESSING METHOD, OPERATION PROCESSING DEVICE, AND CONTROL METHOD

(71) Applicant: Lenovo (Beijing) Co., Ltd., Haidian District, Beijing (CN)

(72) Inventors: Manjun Xiao, Beijing (CN); Xiaohui Xie, Beijing (CN); Zhigang Li, Beijing (CN); Rui Lu, Beijing (CN); Zhiwei Zeng, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 416 days.

(21) Appl. No.: 14/230,667

(22) Filed: Mar. 31, 2014

(65) Prior Publication Data
US 2015/0067589 A1    Mar. 5, 2015

(30) Foreign Application Priority Data

Aug. 28, 2013 (CN) .......................... 2013 1 0382207
Sep. 26, 2013 (CN) .......................... 2013 1 0445520

(51) Int. Cl.
*G06F 3/0488* (2013.01)
*G06F 3/0484* (2013.01)
(Continued)

(52) U.S. Cl.
CPC ............ *G06F 3/0484* (2013.01); *G06F 3/017* (2013.01); *G06F 3/0481* (2013.01);
(Continued)

(58) Field of Classification Search
None
See application file for complete search history.

(56) References Cited

U.S. PATENT DOCUMENTS 5,455,906 A * 10/1995 Usuda ................... G06F 3/0481
345/179
8,976,140 B2 * 3/2015 Hirata ................... G06F 3/0416
345/173
(Continued)

FOREIGN PATENT DOCUMENTS

CN    101382868 A    3/2009
CN    102968215 A    3/2013
(Continued)

OTHER PUBLICATIONS

Office Action, and English language translation thereof, in corresponding Chinese Application No. 201310382207.5, dated Dec. 5, 2016, 15 pages.
(Continued)

*Primary Examiner* — Maryam Ipakchi
(74) *Attorney, Agent, or Firm* — Brinks Gilson & Lione; G. Peter Nichols

(57) ABSTRACT

An operation processing method and an operation processing device applied in an electronic apparatus include a display unit in which a first interactive interface having a first size is displayed. The method includes displaying a second interactive interface having a second size which is different from the first size and having a mapping relation with the first interactive interface in the display unit, detecting a first action executed by the user in the second interactive interface; and executing a first operation in the first interactive interface according to the first action. Thus, the first interactive interface can be mapped into the second interactive interface and the first operation that the user expects to execute in the first interactive interface can be implemented by the first action executed in the second interactive interface, so that the user can conveniently operate the electronic apparatus.

18 Claims, 12 Drawing Sheets

(51) Int. Cl.
*G06F 3/01* (2006.01)
*G06F 3/0481* (2013.01)

(52) U.S. Cl.
CPC .................. *G06F 3/04883* (2013.01); *G06F 2203/04101* (2013.01); *G06F 2203/04108* (2013.01)

(56) References Cited

U.S. PATENT DOCUMENTS

| | | | | |
|---|---|---|---|---|
| 2006/0132455 | A1* | 6/2006 | Rimas-Ribikauskas | G06F 3/0414 345/173 |
| 2009/0070670 | A1* | 3/2009 | Kishi | G06F 3/04886 715/702 |
| 2009/0289914 | A1* | 11/2009 | Cho | G06F 3/044 345/173 |
| 2009/0327977 | A1* | 12/2009 | Bachfischer | B60K 35/00 715/863 |
| 2010/0253620 | A1* | 10/2010 | Singhal | G06F 3/0488 345/157 |
| 2011/0214063 | A1* | 9/2011 | Saul | G06F 3/0481 715/740 |
| 2012/0044164 | A1* | 2/2012 | Kim | G06F 3/04842 345/173 |
| 2013/0009903 | A1* | 1/2013 | Shiota | G06F 3/04817 345/173 |
| 2013/0055143 | A1* | 2/2013 | Martin | G06F 3/0425 715/779 |
| 2013/0237288 | A1* | 9/2013 | Lee | G06F 3/041 455/566 |
| 2013/0290887 | A1* | 10/2013 | Sun | G06F 3/0482 715/769 |
| 2013/0307797 | A1* | 11/2013 | Taguchi | A61B 3/113 345/173 |
| 2014/0040826 | A1* | 2/2014 | Wei | G06F 3/0488 715/810 |
| 2014/0160073 | A1* | 6/2014 | Matsuki | G06F 3/0485 345/174 |
| 2014/0289642 | A1* | 9/2014 | Prasad | G06F 3/048 715/745 |
| 2014/0306889 | A1* | 10/2014 | Kresl | G06F 3/033 345/157 |

FOREIGN PATENT DOCUMENTS

| | | |
|---|---|---|
| CN | 103312890 A | 9/2013 |
| EP | 2 637 086 A1 | 9/2013 |
| WO | WO 2012/077273 A1 | 6/2012 |

OTHER PUBLICATIONS

Office Action, and English language translation thereof, in corresponding Chinese Application No. 201310445520.9, dated Mar. 3, 2017, 23 pages.

* cited by examiner

OPERATION PROCESSING METHOD, OPERATION PROCESSING DEVICE, AND CONTROL METHOD

BACKGROUND

This application claims priority to Chinese patent application No. 201310382207.5 filed on Aug. 28, 2013, and Chinese patent application No. 201310445520.9 filed on Sep. 26, 2013, the entire contents of which are incorporated herein by reference.

The present invention relates to field of computer technology, and in particular, the present invention relates to an operation processing method and an operation processing device.

In recent years, the electronic apparatus such as a notebook computer, a desktop computer, a tablet computer (PAD), a mobile telephone, a multimedia player, a personal digital assistant (PDA) become popular. In such electronic apparatus, a display module and a control module (for example, a touch control module and/or a hover control module) are provided stacked to form a display screen having control function. The user can control an operable object displayed on the display screen by carrying out a touch gesture operation and/or a hover gesture operation to such display screen so as to implement various kinds of interactive operations with the electronic apparatus.

With continuous pursue to the comfort of usage of the user, a large screen electronic apparatus such as a smart desktop has been generated and got fast development on the basis of the above-described electronic apparatus. However, the inventor notes that, in the interactive environment of the large screen electronic apparatus, many interactive modes on the electronic apparatus of a small screen electronic apparatus (for example, the conventional smart phone) become infeasible or not so natural.

In particular, in case of the small screen electronic apparatus, due to the limitation of the size, the user can conveniently touch any position of the screen to take interactive operation to the electronic apparatus generally. However, in case of the large screen electronic apparatus, the user is usually at one side of the electronic apparatus, and since the size of the screen is very large (i.e., the operable range of the screen is very large), the hand of the user generally can't reach throughout the entire screen or very inconvenient to reach throughout the entire screen. Therefore, the user is difficult to control the screen display content with a farther distance to him on the screen by executing the gesture operation directly. This problem is particularly prominent in a scene of an ultra-large screen multi-user interaction.

In order for the user to operate target with a farther distance thereto on the screen, there usually adopts the following two methods. The first one is to make the user to walk near the location of the target that needs to be operated, however, this method is usually very inconvenient; it not only needs the user to move between locations ceaselessly, and may also influence the normal usage of other users. Another method is providing mouse to the user, however, this method needs to provide a plurality of mousse to a plurality of users who operate at the same time on the one hand, and it loses various advantages of the display screen having control function on the other hand.

Therefore, there needs a novel operation processing method and operation processing device to solve the above problem.

SUMMARY

In order to solve the above-described technical problems, according to one aspect of the embodiments of the present invention, there provides an operation processing method applied in an electronic apparatus including a display unit in which a first interactive interface having a first size is displayed, the method includes: displaying a second interactive interface having a second size that is different from the first size in the display unit, here the first interactive interface has a mapping relation with the second interactive interface; detecting a first action executed by the user in the second interactive interface; and executing the first operation in the first interactive interface according to the first action.

Further, according to another aspect of the embodiments of the present invention, there provides an operation processing device applied in an electronic apparatus including a display unit in which a first interactive interface having a first size is displayed, the operation processing device includes: an interface display unit for displaying a second interactive interface having a second size that is different from the first size in the display unit, here the first interactive interface has a mapping relation with the second interactive interface; a first detecting unit for detecting a first action executed by the user in the second interactive interface; and an operation executing unit for executing the first operation in the first interactive interface according to the first action.

As compared to the prior arts, the first interactive interface can be mapped into the second interactive interface and the first operation that the user expects to execute in the first interactive interface can be implemented by the first action executed in the second interactive interface by adopting the operation processing method and the operation processing device according to the embodiments of the present invention, so that the user can operate the electronic apparatus conveniently.

Other characteristics and advantages of the present invention are explained in the subsequent specification, and are obvious partly from the specification and can be understood by implementing the present invention. The object and other advantages of the present invention can be implemented and obtained by the structures pointed particularly in the specification, the claims and the accompanying drawings.

BRIEF DESCRIPTION OF THE DRAWINGS

In order to describe the technical solution of the embodiment of the invention more clearly, the accompanying drawings necessary for the description of the embodiments are explained simply. The accompanying drawings in the following description are only exemplary embodiment of the invention.

DETAILED DESCRIPTION

Hereinafter, the preferred embodiments of the invention are described detailed with reference to the accompanying drawings. It is noticed that in the specification and accompanying drawings, substantially same steps and elements are represented by same reference numbers, and the repetitive explanation on these steps and elements would be omitted.

Firstly, the operation processing method according to the embodiments of the present invention is described.

The operation processing method according to the embodiments of the present invention is applied in an electronic apparatus, and the electronic apparatus may be a portable electronic apparatus such as a personal computer, a smart television, a tablet computer, a mobile telephone, a digital camera, a personal digital assistant, a portable computer, a game machine or the like. The electronic apparatus may also be a large screen electronic apparatus such as a smart desktop. Here, large screen represents that one hand of a person can't cover the entire screen range generally.

The electronic apparatus includes at least a display unit such as a display screen in structure. The display unit includes a display module for displaying various objects, and the objects may be pictures, documents or the like stored in the electronic apparatus or may be display interfaces or the like of system applications or user applications installed in the electronic apparatus to the control pieces thereof. Further, the display unit also includes a control module for receiving a touch control gesture and/or a hover control gesture of the user. The control module can be formed in various ways such as a resistive transducer, a capacitive transducer or the like.

Optionally, the display module can be provided stacked with the control module in the display unit to form a display unit having control function (for example, a touch control display screen or a hover control display screen). The user can control the object intuitively by carrying out the gesture operation to the operable object displayed on the display unit to implement various interactive operations between the user and the electronic apparatus.

Hereinafter, the electronic apparatus is preferably described as the large screen electronic apparatus such as the smart desktop. However, the electronic apparatus in the embodiments of the present invention are not limited to the above-described large screen electronic apparatus, it can refer to any electronic apparatus including display screen having control function in broad sense. The specific type of the electronic apparatus does not make any restriction to the present invention. The present invention can be applied in the common electronic apparatus having the small screen likewise, as long as the user can operate the entire screen by operating a local range of the screen.

Figure 1:
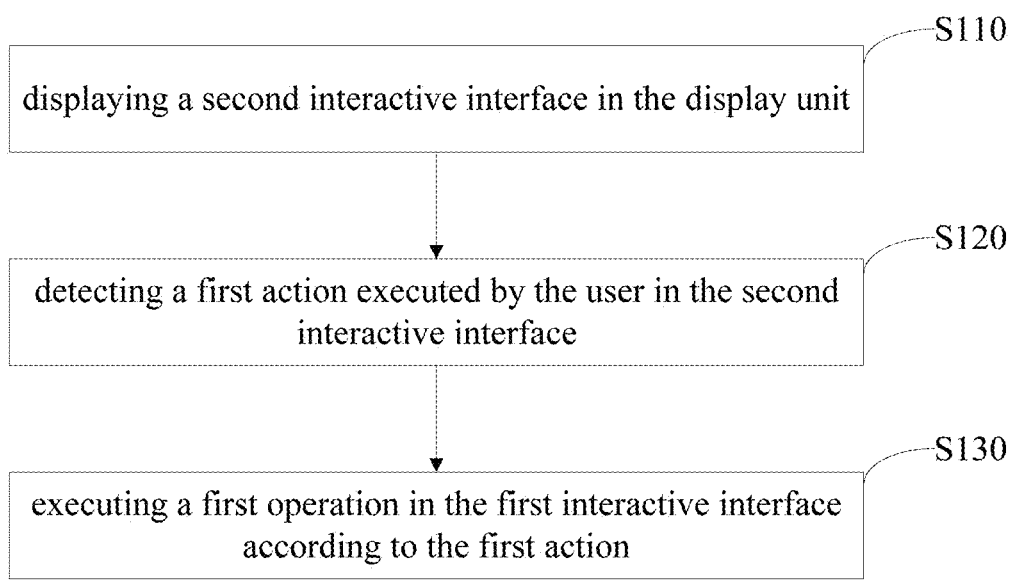
FIG. 1 illustrates the operation processing method according to the embodiments of the present invention.

FIG. 1 illustrates the operation processing method according to the embodiments of the present invention.

The operation processing method shown in FIG. 1 can be applied in an electronic apparatus including a display unit in which a first interactive interface having a first size is displayed.

As shown in FIG. 1, the operation processing method includes:

In step S110, a second interactive interface having a second size that is different from the first size is displayed in the display unit, and the first interactive interface has a mapping relation with the second interactive interface.

In step S120, a first action executed by the user in the second interactive interface is detected.

In step S130, a first operation is executed in the first interactive interface according to the first action.

Thus, it can be seen that, the first interactive interface can be mapped into the second interactive interface and the first operation that the user expects to execute in the first interactive interface can be implemented by the first action executed in the second interactive interface by adopting the operation processing method and the operation processing device according to the embodiments of the present invention, so that the user can operate the electronic apparatus conveniently.

Figure 2:
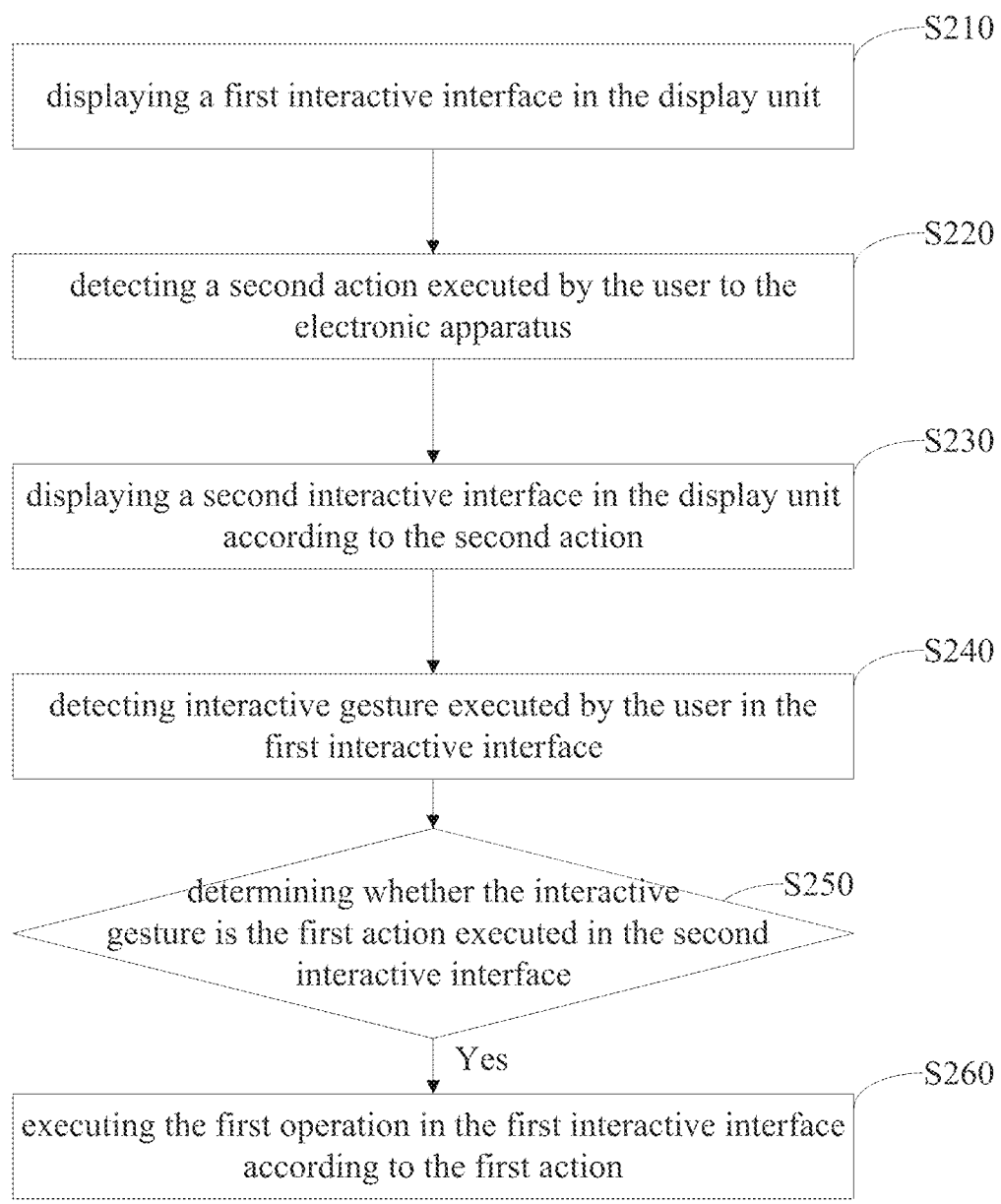
FIG. 2 illustrates the operation processing method according to the first embodiment of the present invention.

FIG. 2 illustrates the operation processing method according to the first embodiment of the present invention.

The operation processing method shown in FIG. 2 can be applied in an electronic apparatus including the display unit. For example, the display unit may be a display screen having touch control function and/or hover control function.

As shown in FIG. 2, the operation processing method includes:

In step S210, a first interactive interface is displayed in the display unit.

When the user wants to use the electronic apparatus to execute operation needed by himself, the user turns on the power supply of the electronic apparatus firstly so as to make the electronic apparatus power-on.

Correspondingly, for example, a power supple unit may be included in the electronic apparatus, and the power supple unit is for detecting the power-on operation executed by the user and supplying electric power to the entire electronic apparatus.

For example, the electronic apparatus may also include a processing unit for example a central processing unit (CPU). The processing unit is for processing and handling various data and scheduling and controlling all of the operations in the electronic apparatus after power-on.

In order for the user to be able to execute operations required, the processing unit can provide display signal to the display unit, so as to display the first interactive interface in the display unit, so that the user completes interactive control of the electronic apparatus through the first interactive interface.

Figure 3A:
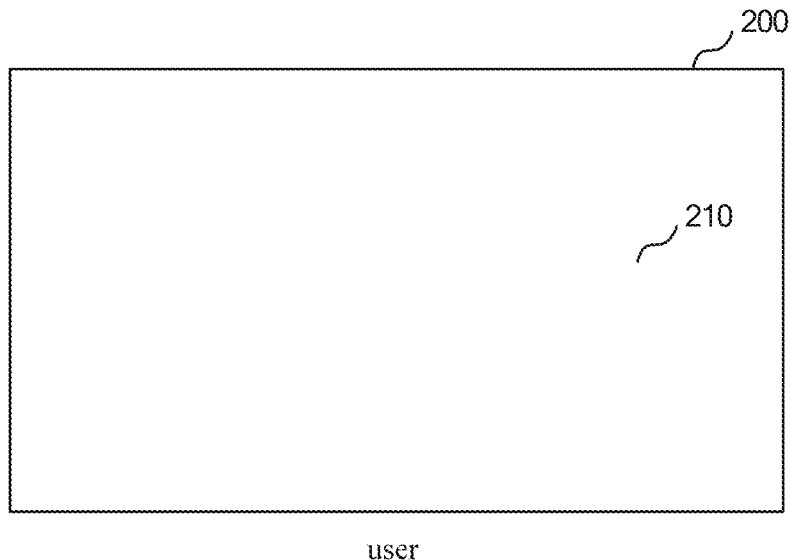
FIG. 3A illustrates a first example of the display unit according to the embodiments of the present invention.

FIG. 3A illustrates the first example of the display unit according to the embodiments of the present invention.

As shown in FIG. 3A, in the first example, the first interactive interface 210 can be displayed fully in the display unit (the display screen) 200 of the electronic apparatus. That is, the first size of the first interactive interface 210 can be equal to the entire screen size of the display unit 200. Thus, the user can make the electronic apparatus execute functions required by himself by inputting the touch control gesture and/or the hover control gesture in the entire screen range, for example, functions of displaying picture, playing movie, editing document, playing games or the like in full screen.

Figure 3B:
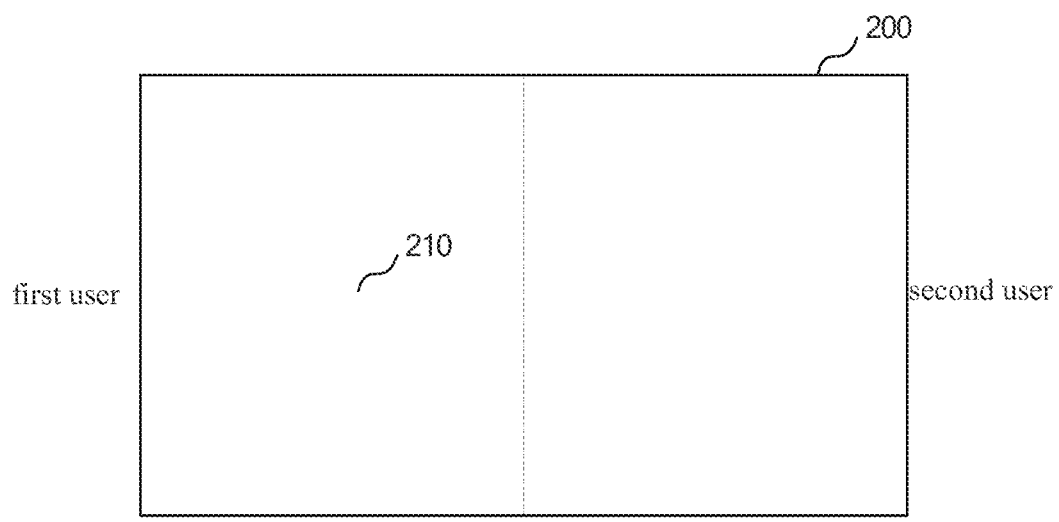
FIG. 3B illustrates a second example of the display unit according to the embodiments of the present invention.

FIG. 3B illustrates the second example of the display unit according to the embodiments of the present invention.

As shown in FIG. 3B, in the second example, the first interactive interface 210 can be displayed in a part of the display unit (the display screen) 200 of the electronic apparatus. That is, the first size of the first interactive interface 210 can be less than the entire screen size of the display unit 200. Thus, the user can execute functions required by him in a partial screen range by inputting the control gesture in the partial screen range.

For example, the second example can be applied in the following scene in which the electronic apparatus is for example a large screen smart desktop operated by a plurality of user simultaneously. At this time, the entire screen range of the display unit 200 can be divided into a plurality of parts, and one or more parts are assigned to a user as the interactive interface of the user, so that each user can execute his own task independently without influencing other users.

In particular, in FIG. 3B, it assumes that there are two users of the first user and the second user, and the left half part of the display unit 200 is assigned to the first user as the first interactive interface 210 of the first user; and the right half part of the display unit 200 is assigned to the second user as the first interactive interface 210 of the second user. Further, by assigning processing resource of the processing unit reasonably, the first user and second user are made to execute functions required by themselves in their own interactive interfaces simultaneously.

For brevity and clarity, hereinafter, the first embodiment of the present invention are continued to be described by taking the first example as example and in the following scene in which it assumes preferably that the electronic apparatus is the large screen electronic apparatus of smart desktop. However, it needs to explain that the present invention is not limited thereto. For example, the electronic apparatus may be the electronic apparatus include a display screen having any sizes.

In case of the large screen electronic apparatus, the user is usually at one side of the electronic apparatus, and since the size of the screen is very large, the user is difficult to interact with the screen display content having a farther distance to him. For example, as shown in FIG. 3A, when the user at the bottom side of the first interactive interface wants to carry out magnifying, reducing or rotating operation to the picture displayed on the upper side of the first interactive interface 210, or he wants to move the picture to vicinity of himself and so on, the user can only move his hand to the operational location of the picture by extending his arm as possible and execute the required gesture. However, if the length between the upper and bottom sides of the screen exceeds the length of the arm of the user, the user can't execute the above operation at the current location and have to move his position to operate, which is very inconvenient for the user.

Therefore, in the operation processing method according to the first embodiment of the present invention, a second interactive interface which is preferably at the vicinity of the user is provided to the user, so that the user can execute required action (for example, the touch control gesture, the hover control gesture, a voice input, an expression variation or the like) therein so as to operate the entire display screen. Thus, the user is made to operate for example the large screen electronic apparatus conveniently.

Therefore, the user needs to execute a second action to the electronic apparatus firstly so as to trigger the electronic apparatus to display the second interactive interface in the display unit.

In step S220, the second action executed by the user to the electronic apparatus is detected.

Correspondingly, in the electronic apparatus, the second action executed thereto by the user is detected, and whether the second action satisfies a first condition for triggering to display the second interactive interface is decided. If the second action satisfies the first condition, the second interactive interface is displayed in the display unit according to the second action. Here, the second interactive interface has a second size, and there is a mapping relation between the first interactive interface and the second interactive interface.

In particular, the electronic apparatus can receive the second action input by the user through various manners.

In the first example, the electronic apparatus may include a text input unit (for example, a keyboard, a handwritten pen) for receiving handwritten signal input by the user and carrying out text recognition to the handwritten signal and deciding whether the handwritten signal is a preset text (for example, "open thumbnail section"). And, if the handwritten signal is the preset text, the display unit is triggered to execute display operation of the second interactive interface.

In the second example, the electronic apparatus may include a sound collecting unit (for example, a microphone) for receiving sound signal input by the user and carrying out voice recognition to the sound signal and deciding whether the sound signal is a preset voice (for example, "initiating thumbnail"). And, if the sound signal is the preset voice, the display unit is triggered to execute display operation of the second interactive interface.

In the third example, the electronic apparatus may include an image collecting unit (for example, a camera head) for capturing image signal (for example, two-dimensional code or QR code or the like) and determining whether the second action is detected by recognizing image from the image signal.

In the fourth example, the electronic apparatus may include a gesture collecting unit (for example, a touch screen, a camera head) for capturing gesture signal and determining whether the second action is detected by recognizing gesture from the gesture signal.

In particular, for example, the gesture collecting unit may be a camera head or a touch screen supporting hover control function which is for capturing hover gesture signal executed by the user and comparing it with a gesture for triggering. For example, at this time, the gesture for triggering can be set as expressing that the user needs to carry out abbreviated interaction to the full screen content at this time by a fist hovering (in which the centre of the palm faces downward). When it detects that the user executes the gesture for triggering, the second interactive interface is displayed in the display unit.

Also for example, the gesture collecting unit may be a touch screen supporting touch control function which is for capturing touch gesture signal executed by the user and comparing it with the gesture for triggering. Here, the gesture for triggering may be any operation of touching the display screen by the user, for example, the user can touch the display screen by one or more fingers or slide on the display screen by finger, for example, draw a pattern of a closed shape and so on. It assumes that the gesture for triggering is set as expressing that the user needs to carry out abbreviated interaction to the full screen content at this time by drawing a closed circle on the touch screen. When it detects that the user executes the gesture for triggering, the second interactive interface is displayed in the display unit.

In step S230, the second interactive interface is displayed in the display unit according to the second action.

After detecting that the second action satisfies the condition for triggering, before displaying the second interactive interface, display modes of the second interactive interface in the display unit are further determined according to the second action. The display modes include at least one of the following respective items: a display position, a display size (or referred as the second size) and a speed of change in the size, and the second interactive interface is displayed in the display unit according to the display mode determined.

In the above case in which the gesture for triggering is the fist hovering, a vertical projection position of the fist of the user in the display unit (in this example, it is the first interactive interface) is determined by the gesture collecting unit, and the original display position of the second interactive interface is determined according to the vertical projection position. For example, the projection position can be a center point, a left peak or other reference position point of the second interactive interface.

After indicating the original position of the second interactive interface at the place where the fist hovers, a prompt icon (for example, a bubble) is preferably displayed at the original position, so as to facilitate the user to understand whether the position where the second interactive interface appears in the first interactive interface is the position required by himself. If the user wants to change the original position, the user can move the hovering fist, and the electronic apparatus moves the prompt icon of the shape of the bubble displayed in the first interactive interface according to the result captured by the gesture collecting unit, so that the user decides whether the original position is compliant with his own need.

Then, the user can stretch his fist gradually to the palm, so that the bubble icon expands to the second interactive interface gradually. Correspondingly, in the electronic apparatus, the gesture collecting unit can sense the degree and the velocity of stretching the palm of the user, so that the expanded size of the second interactive interface is determined according to degree of stretching the palm, and/or the expanded velocity of the second interactive interface is determined according to velocity of stretching the palm.

For example, when the gesture collecting unit senses that the hand of the user keeps as the fist, the second interactive interface is not displayed, but a prompt icon of the shape of bubble is displayed at the corresponding position. Then, when the gesture collecting unit senses that the hand of the user stretches from the fist to a status of half making the fist in a first velocity (here, the palm stretches to a half degree), the second interactive interface is displayed, and the second size of the second interactive interface is preferably changed from zero to a half of the first size of the first interactive interface in the first velocity. At last, when the gesture collecting unit senses that the hand of the user stretches from a status of half making the fist to a status of the palm in a second speed, the second size of the second interactive interface is changed from a half of the first size to the first size in the second speed, so that the second interactive interface is full in the first interactive interface.

In the above, the maximum size of the second interactive interface when the hand of the user stretches to the palm completely is defined as the first size of the first interactive interface (in this example, it is the entire size of the display unit). However, the present invention is not limited thereto. The maximum size of the second interactive interface can be defined as any proportion of the first size, for example, a half of the first size, a quarter of the first size, eighth of the first size or the like; or it is defined as any absolute size, for example, 16 cm×9 cm, 4 cm×3 cm, and so on.

In case that the gesture for triggering is drawing the circle, the center of the circle drawn by the user can be determined as the center point of the second interactive interface by the gesture collecting unit, and the second interactive interface of a preset size is displayed at the center point. Then, the gesture collecting unit can further detect touch control gesture by the user to the second interactive interface. For example, when it detects that the user taps and holds on the second interactive interface by a finger and drags towards a certain position, the second interactive interface is moved to the position correspondingly. Also for example, when it detects that the user taps and holds on the upper left corner and lower right corner of the second interactive interface by a single finger of the left and right hand and drags in the diagonal direction, the second size of the second interactive interface is re-determined according to the amplitude of the stretch of the user.

Though displaying the graphical user interfaces of the second interactive interface is described above with specific concrete example, it is obvious that the present invention is not limited thereto, and the display of the second interactive interface can be determined by using other manner known by those skilled in the art.

Further, in the procedure of displaying the second interactive interface in the display unit according to the above display mode, the display content of the second interactive interface can be determined according to the mapping relation between the second interactive interface and the first interactive interface.

The specific determination mode of the mapping relation can be set according to practical application scene. Preferably, the mapping relation between the two interfaces can be determined accurately according to the proportional relation between the first size of the first interactive interface and the second size of the second interactive interface, so that the coordinates in the second interactive interface corresponds to the coordinates in the first interactive interface proportionally (or in other functional relationship). Thus, the operation of the second position in the second interactive interface is made to correspond to the operation of the first position in the first interactive interface proportionally. Alternatively, the mapping relation between the two interfaces can be determined approximately according to such size proportional relation and a fuzzy algorithm.

After determining the mapping relation, in one case, in the procedure of displaying the second interactive interface, for example, the first interactive interface can be zoomed according to the mapping relation, and the zoomed first interactive interface is displayed in the display unit as the second interactive interface.

Figure 4A:
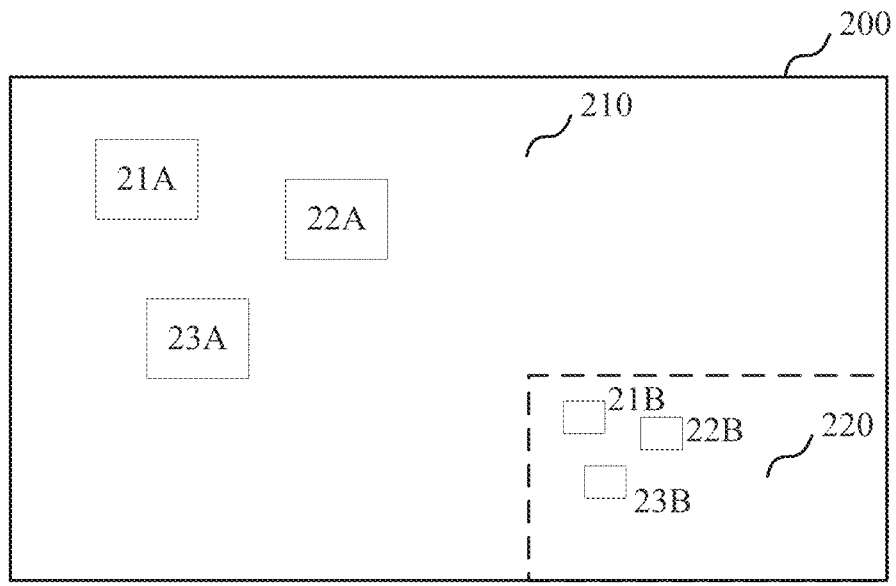
FIG. 4A illustrates a first mapping relation between the first interactive interface and the second interactive interface according to the embodiments of the present invention.

FIG. 4A illustrates a first mapping relation between the first interactive interface and the second interactive interface according to the embodiments of the present invention.

The display unit 200 of the electronic apparatus is shown in FIG. 4A. The first interactive interface 210 is displayed fully in the display unit 200. Operable objects 21A, 22A and 23A are included in the first interactive interface 210, and the operable objects 21A, 22A and 23A may be files, file folders, icons of application software, images displayed, videos played or the like.

Further, FIG. 4A also illustrates the second interactive interface 220 displayed in the display unit 200, in this example, the second interactive interface 220 is a local abbreviated region displayed on the first interactive interface and having consistent but reduced shape with the first interactive interface 210. Preferably, the second interactive interface 220 is always at an upper layer of the first interactive interface 210.

As shown in FIG. 4A, the real interface of the first interactive interface in full screen is displayed reduced in the second interactive interface 220 in which the operable objects 21A, 22A and 23A are displayed reduced as operable objects 21B, 22B and 23B. Here, the manner of displaying reduced (i.e., the mapping manner) is preferably the coordinates in the first interactive interface 210 being corresponding one by one to the coordinates in the second interactive interface 220 proportionally. However, as explained in the above, it does not limit to such manner of being proportional, the coordinates in the first interactive interface 210 may be corresponding to the coordinates in the second interactive interface 220 one by one out of proportion, for example, when the shapes of the first interactive interface 210 and the second interactive interface 220 are different, the interface of the first interactive interface 210 can be displayed in the second interactive interface 220 deformed.

Further, in another case, in the procedure of displaying the second interactive interface, for example, a blank interactive interface can be displayed in the display unit as the second interactive interface. The operable objects included in the first interactive interface are detected, layout information of the operable objects in the first interactive interface is determined, and virtual objects are displayed in the blank interactive interface according to the layout information, the virtual objects are mapped into the operable objects according to the mapping relation.

Still with reference to FIG. 4A, in the procedure of displaying the second interactive interface, rather than displaying the real interface of the first interactive interface 210 reduced in the second interactive interface 220, the operable objects 21A, 22A and 23A in the first interactive interface 210 are detected and object information is generated, and, the layout information such as the shapes, the sizes and the positions of these operable objects in the first interactive interface is determined. Then, the virtual objects 21B, 22B and 23B corresponding to the real operable objects 21A, 22A and 23A in the first interactive interface one by one are displayed in the blank second interactive interface 220 according to the object information and the layout information. Here, each virtual object is expressed by geometric shape and text description simply instead of the reduced display of the real operable object. The geometric shape may be for example white box which needs not revert the icon pattern of the real operable object and in which content such as image or video screenshot or the like is displayed. The text description may be the name of the operable object, content displayed in a title bar, or summary information of the specific text or the like, as long as the user can determine the real operable object corresponding to the virtual object. Further, a background image or any inoperable object of the first interactive interface 210 is not displayed in the second interactive interface.

Thus, as compared to the former case, the display of the second interactive interface can be simplified, which saves processing resource of the electronic apparatus and extends stand-by time of the electronic apparatus.

In step S240, an interactive gesture executed by the user in the first interactive interface is detected.

After displaying the second interactive interface in the first interactive interface, the interactive gesture executed by the user in the first interactive interface is detected.

In case of the hover control, the electronic apparatus can shoot the image of the user and recognize it by using the camera head, so as to capture the interactive gesture executed by the user above the first interactive interface. The camera head may be integrated into the electronic apparatus or arranged around the electronic apparatus and communicated with the electronic apparatus so as to determine position coordinates of the vertical projection of the interactive gesture in the display unit of the electronic apparatus, or even in the first interactive interface (in this example, these two are same).

Alternatively, the electronic apparatus may also sense variation of parameter such as electrostatic capacity or the like by a sensor so as to capture the interactive gesture executed by the user above the first interactive interface. The sensor may be for example a capacitive transducer and integrated into the display unit of the electronic apparatus to form a capacitive touch screen.

Further, in case of the touch control, the touch screen may further capture the interactive gesture executed by the user by touching the first interactive interface.

In step S250, whether the interactive gesture is the first action executed in the second interactive interface is determined.

After detecting the interactive gesture, first global coordinates of the interactive gesture in the first interactive interface can be determined, and whether at least a part of the interactive gesture is executed in the second interactive interface is decided according to the first global coordinates.

If it decides that none of the part of the interactive gesture is executed in the second interactive interface, the interactive gesture is determined as a third action, and a second operation is executed in the first interactive interface according to the third action.

In particular, as shown in FIG. 4A, the operable objects 21B, 22B and 23B corresponding to the operable objects 21A, 22A and 23A in the first interactive interface 210 are displayed in the second interactive interface 220. It is obvious that these operable objects 21B, 22B and 23B are in the range of the second interactive interface and also in the range of the first interactive interface 210. Hereinafter, coordinates values of these objects in the second interactive interface 220 are referred as local coordinates; and coordinates values of these objects in the display unit 200 (in this example, it is in the first interactive interface 210) are referred as global coordinates.

Therefore, after detecting the interactive gesture executed by the user in the first interactive interface in step S240, tracing points included in the interactive gesture can be determined. For example, if the interactive gesture is a single click, only one tracing point is included in the interactive gesture; if the interactive gesture is a double click, one tracing point or two tracing points with few distance may be included in the interactive gesture; if the interactive gesture is dragging or flicking, a series of continuous tracing points may be included in the interactive gesture; and if the interactive gesture is kneading or expanding, two series of continuous tracing points may be included in the interactive gesture.

Then, the set of the global coordinates of the tracing point included in the interactive gesture is determined, and it decides whether at least a part of the global coordinates of the tracing point is in the range of the second interactive interface. If not, it represents that the interactive gesture is an operation made to the operable objects 21A, 22A and 23A by the user directly in the first interactive interface, and then, the operable objects 21A, 22A and 23A are processed correspondingly according to the normal process.

And if so, it represents that the interactive gesture may be an operation made by the user to the operable objects 21B, 22B and 23B in the second interactive interface. However, since when the user wishes to operate the second interactive interface itself (for example, changing features such as size, position, shape or the like of the second interactive interface), the corresponding action is always done in the second interactive interface, so before determining the interactive gesture as the first action made to the operable objects 21B, 22B and 23B, it needs to decide whether the interactive gesture is made to the second interactive interface itself firstly.

If the interactive gesture is made to the second interactive interface itself, the interactive gesture is determined as a fourth action, and a third operation is executed to the second interactive interface in the first interactive interface according to the fourth action. For example, the third action includes at least one of the following respective items: reducing the second interactive interface, magnifying the second interactive interface, moving the second interactive interface, refreshing the second interactive interface and closing the second interactive interface.

For example, it can decide that the user wishes to operate the second interactive interface itself in the following scenes: in case of the hover control, the user hovers and grabs above the second interactive interface using his palm and move the palm, or the user closes his palm to the fist after hovering above the second interactive interface using his palm to make the second interactive interface disappear. Alternatively, in case of the touch control, the user can tap and hold the second interactive interface by the finger and drag towards a certain position to change the position thereof, or the user may tap and hold the upper left corner and the lower right corner of the second interactive interface by a single finger of the left and right hands and drag in diagonal direction to change the size thereof, or the user can cancel the second interactive interface by flicking the second interactive interface out of the boundary of the first interactive interface, or the user can close the second interactive interface by sliding bilateral boundaries of the second interactive interface by single finger (for example, the user taps and holds a certain position to the left of the left side boundary of the second interactive interface by finger, moves the finger to the right side boundary and release the finger at a certain position to the right of the right side boundary).

If it decides that the interactive gesture is not made to the second interactive interface itself, it represents that the interactive gesture is the first action executed to the operable objects 21B, 22B and 23B by the user in the second interactive interface and for controlling the operable objects 21A, 22A and 23A in the first interactive interface to execute the first operation.

In step S260, the first operation is executed in the first interactive interface according to the first action.

Next, the local coordinates of the first action in the second interactive interface are determined, the local coordinates are mapped into second global coordinates in the first interactive interface, and the first operation is executed in the first interactive interface according to the second global coordinates.

For example, when the user needs to touch to operate the operable objects 21A, 22A and 23A in the first interactive interface 210, he only needs to execute the first action to the operable objects 21B, 22B and 23B in the second interactive interface 220 correspondingly.

At this time, the electronic apparatus determines the local coordinates of the tracing points included in the first action, and maps the local coordinates into the global coordinates in the first interactive interface according to the mapping relation between the first interactive interface 210 and the second interactive interface 220, thus, the operation gesture in the second interactive interface 220 can be mapped into the range of operation of the first interactive interface 210. That is, the virtual operation of the operable objects 21B, 22B and 23B is mapped into the operable objects 21A, 22A and 23A, so as to implement real operation to the operable objects 21A, 22A and 23A.

With reference to FIG. 4A, for example, when the user wishes to move the operable object 21A rightwards in the first interactive interface 210, the user only needs to tap and hold the operable object 21B in the second interactive interface and move it rightwards by a second distance of movement.

At this time, the electronic apparatus can determine the local coordinates of the finger of the user in the second interactive interface firstly, and map them into the global coordinates in the first interactive interface, and decides that the operable object 21A corresponds to the global coordinates. Then, the electronic apparatus can execute the tap and hold operation to the operable object 21A. Next, the electronic apparatus can convert the second distance of movement of the operable object 21B in the second interactive interface 220 into a first distance of movement in the first interactive interface, and move the operable object 21A rightwards by the first distance of movement in the first interactive interface 210.

Thus it can be seen, by adopting the operation processing method according to the first embodiment of the present invention, not only mapped body of the operable object in the first interactive interface (for example, the entire display screen) can be seen in the range of the second interactive interface (for example, an abbreviated interactive region), but also the operation to the entire display screen can be implemented by the operation in the abbreviated interactive region, so as to facilitate the operation of the user significantly.

Therefore, in the first embodiment of the present invention, it solves the technical problem that the operation distance of the user in the large screen interaction or ultra-large screen interaction is limited, and makes the abbreviated region interaction be combined with the full screen interaction, so as to apply to the multi-user interaction scene commendably.

Figure 5:
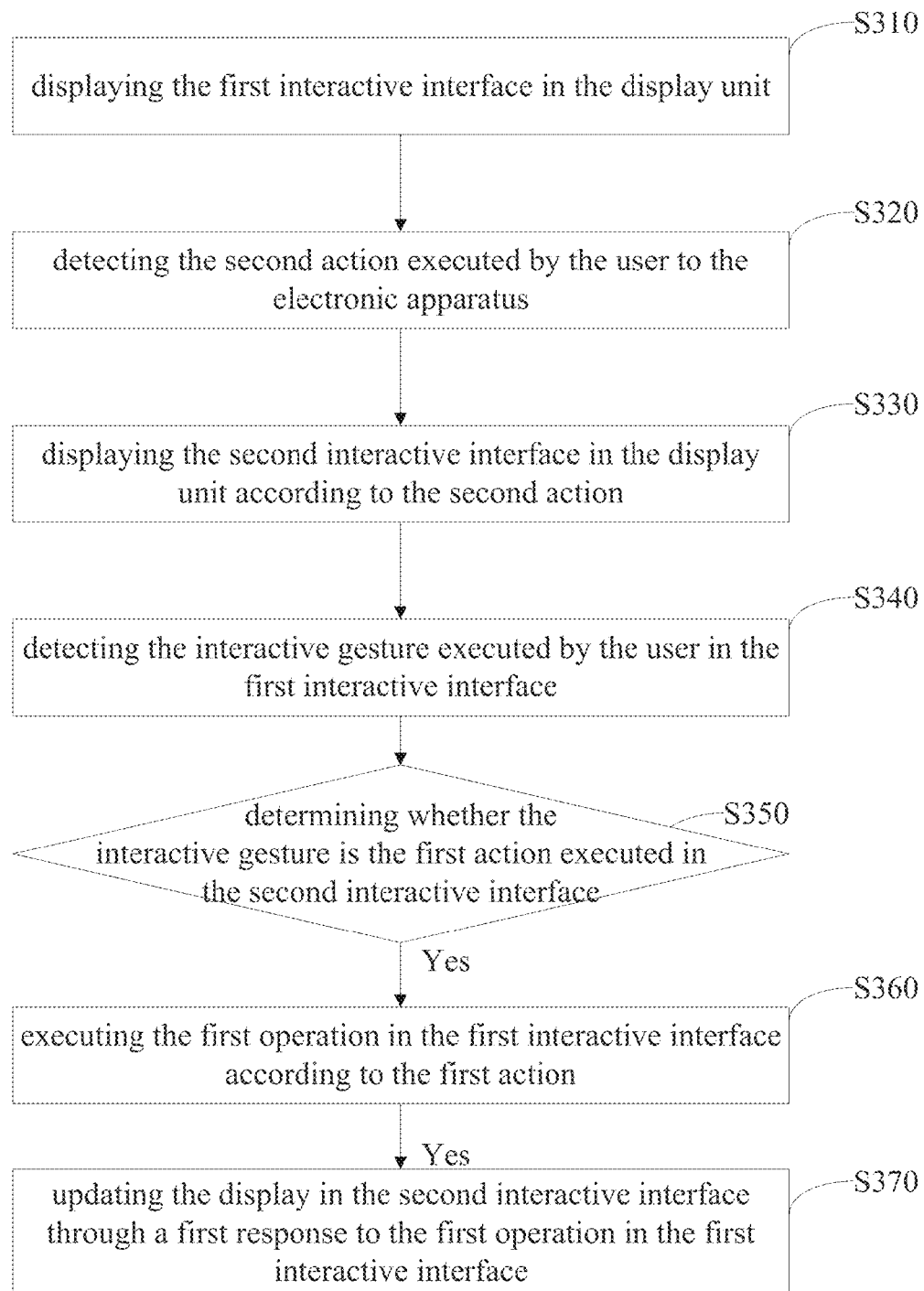
FIG. 5 illustrates the operation processing method according to the second embodiment of the present invention.

FIG. 5 illustrates the operation processing method according to the second embodiment of the present invention.

As shown in FIG. 5, the operation processing method includes:

In step S310, the first interactive interface is displayed in the display unit.

In step S320, the second action executed by the user to the electronic apparatus is detected.

In step S330, the second interactive interface is displayed in the display unit according to the second action.

In step S340, the interactive gesture executed by the user in the first interactive interface is detected.

In step S350, whether the interactive gesture is the first action executed in the second interactive interface is determined.

In step S360, the first operation is executed in the first interactive interface according to the first action.

Steps S310 to S360 in FIG. 5 are same as steps S210 to S260 in FIG. 2 respectively, and thus the repetitive description thereof is omitted. Hereinafter, the differences between the FIG. 5 and the FIG. 2 are described.

In the first embodiment of the present invention, in order to simplify the display, the electronic apparatus can only display operation result of the first action executed by the user to the operable objects 21B, 22B and 23B in the first interactive interface 210 without updating the display in the second interactive interface 220. However, the inventor finds that doing so may cause the content in the second interactive interface 220 to be not synchronous with the content in the first interactive interface 210, so as to cause that the subsequent mapping operation of the user can't be carried out. At this time, preferably, following step S370 is executed to refresh the display in the second interactive interface according to the display in the first interactive interface.

In step S370, the display in the second interactive interface is updated through a first response to the first operation in the first interactive interface.

In one example, after executing the first operation to the first interactive interface 210 according to the first action in the electronic apparatus, the first interactive interface 210 may be zoomed once again according to the mapping relation between the first interactive interface 210 and the second interactive interface 220 to be displayed as the second interactive interface.

Alternatively, the electronic apparatus may re-determine the layout information of the respective operable objects in the first interactive interface to refresh the display of the virtual objects. Or, the electronic apparatus may only determine the layout information of the operable objects operated in the first interactive interface and refresh the display of the virtual objects incrementally, so as to reduce resource requirement of the processing unit.

In another example, when the user operates the operable objects 21B, 22B and 23B in the second interactive interface 220 in order to operate the operable objects 21A, 22A and 23A in the first interactive interface 210, the electronic apparatus can execute the virtual first operation to the operable objects 21B, 22B and 23B in the second interactive interface 220 directly at the same time of executing the actual first operation to the operable objects 21A, 22A and 23A in the first interactive interface 210.

For example, while the user moves the operable object 21A rightwards by the first distance of movement in the first interactive interface 210, the user moves the operable object 21B rightwards by the second distance of movement in the second interactive interface 220.

The inventor also finds that, since the second interactive interface 220 is displayed on the first interactive interface 210 stacked, the second interactive interface 220 may block a part of the display content in the first interactive interface 210. At this time, preferably, after the user completes the interactive operation in the abbreviated interactive region, in order to avoid influencing subsequent operations of the user or other users, the electronic apparatus may further receive the hover control gesture or the touch control gesture of the user or other users to close the virtual interactive region opened.

Thus, it can be seen, by adopting the operation processing method according to the second embodiment of the present invention, not only the operation to the entire display screen is implemented by the operation in the abbreviated interactive region, but also the display in the abbreviated interactive region is refreshed according to the response of the entire display screen to the operation, so that the user can use the abbreviated interactive region to execute subsequent operations continuously.

Further, in the second embodiment of the present invention, the action of moving or closing the abbreviated interactive region of the user may be received, so as to ensure that other operations of the user or other users are not influenced.

It needs to explain that, though it describes above by taking the second size of the second interactive interface being less than the first size of the first interactive interface as example, the present invention is not limited thereto. It is obvious that the second size of the second interactive interface may be larger than or equal to the first size of the first interactive interface.

Figure 4B:
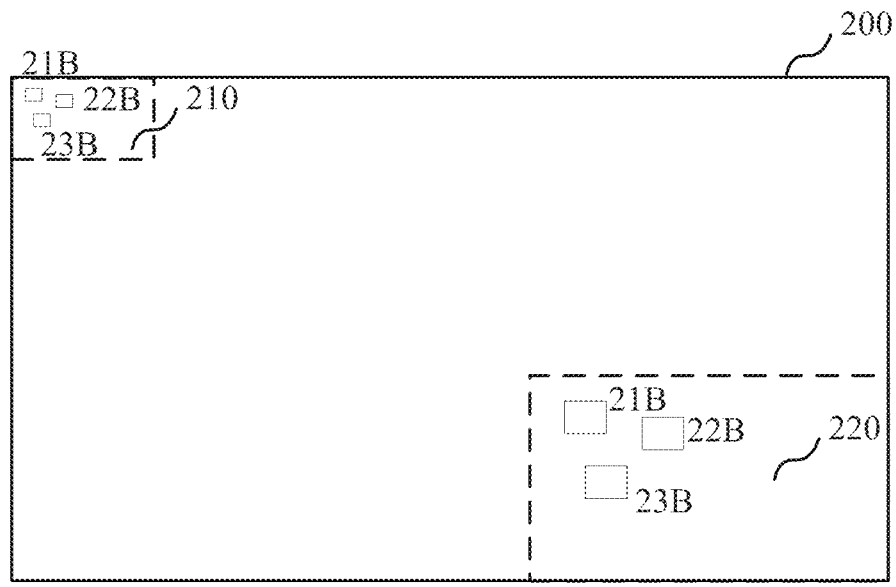
FIG. 4B illustrates a second mapping relation between the first interactive interface and the second interactive interface according to the embodiments of the present invention.

FIG. 4B illustrates a second mapping relation between the first interactive interface and the second interactive interface according to the embodiments of the present invention.

The display unit 200 of the electronic apparatus is shown in FIG. 4B. For example, in order for the display unit 200 being used by a plurality of users, the region of the display unit 200 can be divided into a plurality of sub regions. At this time, the first interactive interface 210 may only displayed in a small partial region in the display unit 200. The operable objects 21A, 22A and 23A may still be included in the first interactive interface 210. However, since the first size of the first interactive interface 210 is relatively small, the sizes of the operable objects 21A, 22A and 23A included in the first interactive interface 210 become smaller correspondingly.

At this time, since the size of the screen is very large, the user at the bottom side of the electronic apparatus is still difficult to interact with the first interactive interface 210 having a farther distance to him. According to the above principle of the present invention, the second interactive interface 220 is displayed at a closer position from the user in the display unit 200. However, if the second interactive interface is still the abbreviated interactive region at this time, the distance between the operable objects 21B, 22B and 23B would become very small, so that the user can't operate them.

Thus, preferably, at the time of displaying the second interactive interface 220 in the display unit 200, the second size of the second interactive interface 220 is made to be larger than the first size of the first interactive interface 210, so that the user can operate the operable objects therein commendably without generating any disoperation.

Figure 4C:
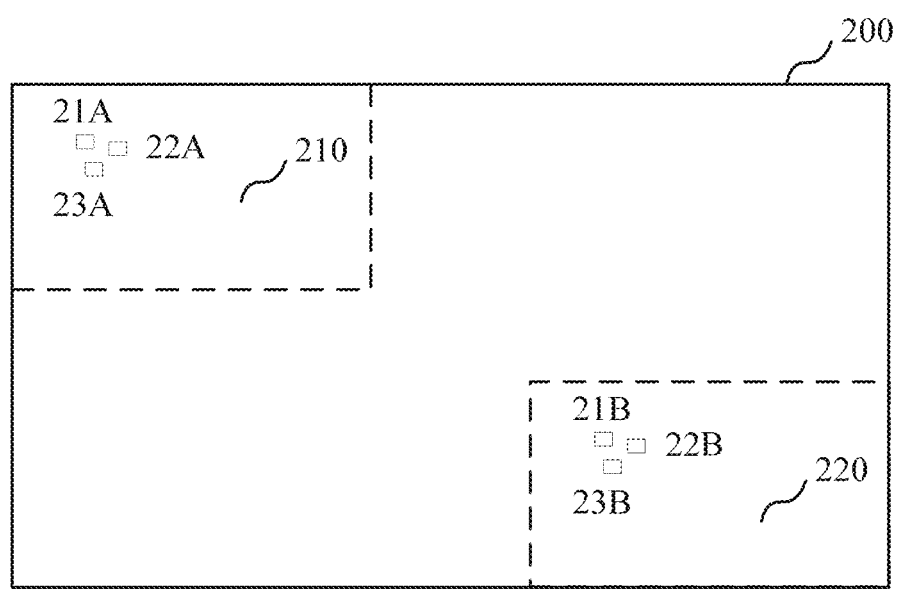
FIG. 4C illustrates a third mapping relation between the first interactive interface and the second interactive interface according to the embodiments of the present invention.

FIG. 4C illustrates a third mapping relation between the first interactive interface and the second interactive interface according to the embodiments of the present invention.

The display unit 200 of the electronic apparatus is shown in FIG. 4C. The first interactive interface 210 is displayed in a partial region in the display unit 200, and the operable objects 21A, 22A and 23A are still included in the first interactive interface 210. Different from FIG. 4B, the first size of the first interactive interface 210 is within a normal operable range of the user.

At this time, the second interactive interface 220 may be displayed at a closer position from the user in the display unit, and the second size of the second interactive interface 220 is made to be equal to the first size of the first interactive interface 210, that is, an interactive region is displayed virtually at the bottom side of the display unit, and the shape and the size of the virtual interactive region and the content therein are completely same as those in the real interactive region at the upper left corner of the display unit. Thus, the second interactive interface 220 is made to be mapped into the first interactive interface 210 equally (with same-size ratio), so as to provide most real operational experience to the user.

Figure 6:
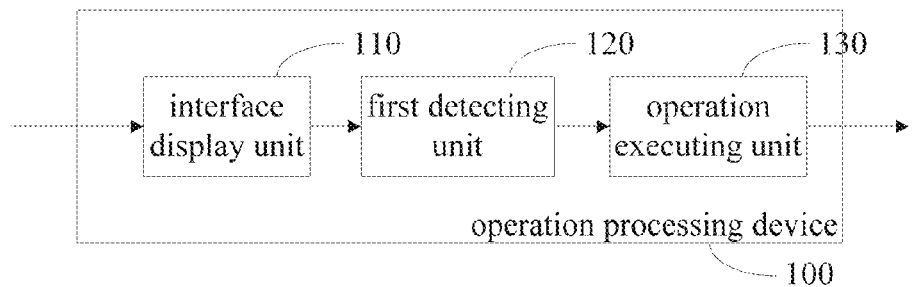
FIG. 6 illustrates the operation processing device according to the embodiments of the present invention.

FIG. 6 illustrates the operation processing device according to the second embodiment of the present invention.

The operation processing device 100 shown in FIG. 6 can be applied in an electronic apparatus including a display unit in which a first interactive interface having a first size is displayed.

As shown in FIG. 6, the operation processing device 100 includes: an interface display unit 110, a first detecting unit 120 and an operation executing unit 130.

The interface display unit 110 is for displaying a second interactive interface having a second size that is different from the first size in the display unit, and the first interactive interface has a mapping relation with the second interactive interface.

The first detecting unit 120 is for detecting a first action executed by the user in the second interactive interface.

The operation executing unit 130 is for executing the first operation in the first interactive interface according to the first action.

Thus, it can be seen that, the first interactive interface can be mapped into the second interactive interface and the first operation that the user expects to execute in the first interactive interface can be implemented by the first action executed in the second interactive interface by adopting the operation processing device according to the embodiments of the present invention, so that the user can operate the electronic apparatus conveniently.

Figure 7:
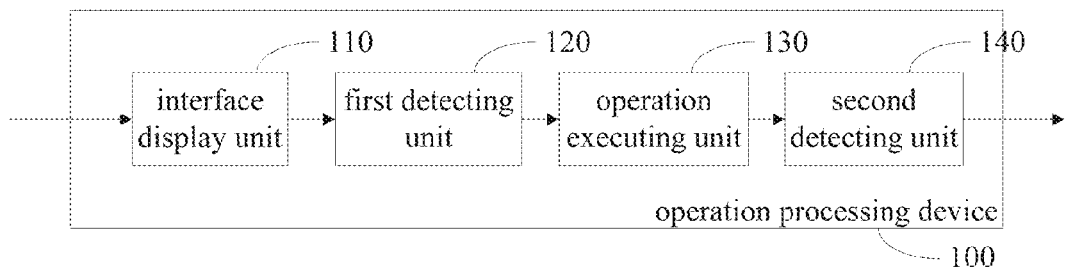
FIG. 7 illustrates the operation processing device according to the first embodiment of the present invention.

FIG. 7 illustrates the operation processing device according to the first embodiment of the present invention.

The operation processing method according to the first embodiment of the present invention shown in FIG. 2 can be implemented by the operation processing device 100 shown in FIG. 7. The operation processing device 100 can be used to execute operational processing to the electronic apparatus, so that the user can operate the operable object having a farther distance from him in the display unit of the electronic apparatus easily.

The operation processing device 100 can communicate with the electronic apparatus by any means.

In an example, the operation processing device 100 can be integrated into the electronic apparatus as a software module and/or a hardware module, in other words, the electronic apparatus may include the operation processing device 100. For example, when the electronic apparatus is a smart desktop, the operation processing device 100 may be a software module in the operating system of the smart desktop, or an application developed for the smart desktop. Of course, the operation processing device 100 may also be one of the many hardware modules of the smart desktop.

Alternatively, in another example, the operation processing device 100 may be separated apparatus from the electronic apparatus, and the operation processing device 100 can be connected to the electronic apparatus through wired and/or wireless network, and transmits interactive information in a prescribed data format.

As shown in FIG. 7, similar to FIG. 6, the operation processing device 100 may include an interface display unit 110, a first detecting unit 120 and an operation executing unit 130. Further, preferably, the operation processing device 100 may also include a second detecting unit 140.

The second detecting unit 140 is for detecting a second action executed by the user to the electronic apparatus and deciding whether the second action satisfies the first condition before displaying the second interactive interface by the interface display unit 110 in the display unit. And, if the second action satisfies the first condition, the second detecting unit 140 notifies the interface display unit 110 of displaying the second interactive interface in the display unit according to the second action.

In particular, the interface display unit 110 determines the display mode of the second interactive interface in the display unit according to the second action detected by the second detecting unit 140. The display mode includes at least one of the following respective items: the display position, the display size and the speed of change in the size. And the interface display unit 110 displays the second interactive interface in the display unit according to the display mode.

Then, in one example, the interface display unit 110 zooms the first interactive interface according to the mapping relation between the first interactive interface and the second interactive interface and displays the zoomed first interactive interface in the display unit as the second interactive interface.

Alternatively, in another example, the interface display unit 110 displays a blank interactive interface in the display unit as the second interactive interface, and detects the operable objects included in the first interactive interface, determines layout information of the operable objects in the first interactive interface, and displays virtual objects in the blank interactive interface according to the layout information, here, the virtual objects are mapped into the operable objects according to the mapping relation.

Next, the first detecting unit 120 detects the interactive gesture executed by the user in the first interactive interface, determines first global coordinates of the interactive gesture in the first interactive interface, decides whether at least a part of the interactive gesture is executed in the second interactive interface according to the first global coordinates. If it decides that at least a part of the interactive gesture is executed in the second interactive interface, the interactive gesture is determined as the first action, and if it decides that none of the part of the interactive gesture is executed in the second interactive interface, the interactive gesture is determined as the third action. And, the first detecting unit 120 notifies the operation executing unit 130 of executing the second operation in the first interactive interface according to the third action.

For example, the first detecting unit 120 determines the interactive gesture as the first action through the following steps: deciding whether the interactive gesture is made to the second interactive interface itself, determining the interactive gesture as the fourth action and notifying the operation executing unit 130 of executing a third operation to the second interactive interface in the first interactive interface according to the fourth action if it decides that the interactive gesture is made to the second interactive interface itself, and determining the interactive gesture as the first action if it decides that the interactive gesture is not made to the second interactive interface itself.

Here, the third action includes at least one of the following respective items: reducing the second interactive interface, magnifying the second interactive interface, moving the second interactive interface, refreshing the second interactive interface and closing the second interactive interface.

In the procedure of executing the first operation in the first interactive interface according to the first action, the operation executing unit 130 determines the local coordinates of the first action in the second interactive interface, maps the local coordinates into the second global coordinates in the first interactive interface according to the mapping relation, and executes the first operation in the first interactive interface according to the second global coordinates.

The detailed configuration and operation of the respective units in the operation processing device 100 according to the first embodiment of the present invention are described detailed in the operation processing method described with reference to the above FIG. 2, and thus, the repetitive description thereof is omitted.

Thus. it can be seen, by adopting the operation processing device according to the first embodiment of the present invention, not only mapped body of the operable object in the first interactive interface (for example, the entire display screen) can be seen in the range of the second interactive interface (for example, an abbreviated interactive region), but also the operation to the entire display screen can be implemented by the operation in the abbreviated interactive region, so as to facilitate the operation of the user significantly.

Figure 8:
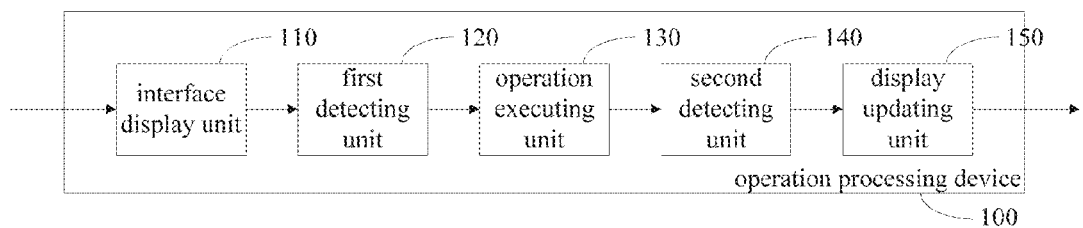
FIG. 8 illustrates the operation processing device according to the second embodiment of the present invention.

FIG. 8 illustrates the operation processing device according to the second embodiment of the present invention.

The operation processing method according to the second embodiment of the present invention shown in FIG. 5 can be implemented by the operation processing device 100 shown in FIG. 8. As shown in FIG. 8, similar to FIG. 7, the operation processing device 100 may include the interface display unit 110, the first detecting unit 120, the operation executing unit 130 and the second detecting unit 140. Further, preferably, the operation processing device 100 may also include a display updating unit 150.

The display updating unit 150 is for updating the display of the second interactive interface by a first response of the first interactive interface to the first operation according to the mapping relation after executing the first operation in the first interactive interface according to the second global coordinates.

The detailed configuration and operation of the respective units in the operation processing device 100 according to the second embodiment of the present invention are described detailed in the operation processing method described with reference to the above FIG. 5, and thus, the repetitive description thereof is omitted.

Thus, it can be seen, by adopting the operation processing device according to the second embodiment of the present invention, not only the operation to the entire display screen is implemented by operation in the abbreviated interactive region, but also the display in the abbreviated interactive region is refreshed according to the response of the entire display screen to the operation, so that the user can use the abbreviated interactive region to complete subsequent operations continuously.

It needs to explain that, though the respective embodiments of the present invention are explained by taking the above respective units as the main body of the execution of the respective steps here, those skilled in the art can understand that the present invention is not limited thereto. The main body of the execution of the respective steps may be as other one or more of apparatus, devices, units or even modules.

For example, the respective steps executed by the above-described interface display unit 110, the first detecting unit 120, the operation executing unit 130, the second detecting unit 140 and the display updating unit 150 may be implemented by a central processing unit (CPU) of the electronic apparatus united.

As explained in the above, with the development of short distance touch display screen, applications of large-scale short distance touch display screen become increasingly popular. In the procedure of the usage of the large-scale short distance touch display screen, when the user operates the target object displayed, the user needs to move to implement operation to different target objects since the distance between the different target objects are rather far.

Therefore, the embodiments of the present invention further provides a control method and a control device for solving the technical problem that the operational method of the conventional touch display screen is inconvenient for the usage of the user.

In order to implement the above-described purpose, the third embodiment of the present invention provides the following technical solutions:

A control method applied in an electronic apparatus having at least a touch display screen, the control method includes:

Displaying an operation object in a second region of the touch display screen after detecting a preset trigger signal in a first region of the touch display screen, the first region being not overlapped with the second region;

Sensing amount of variation of input parameter in the first region, the amount of variation of input parameter being caused by the change in spatial location between a first operation body and the first region;

Controlling the operation object to respond to the amount of variation of input parameter in the second region.

Preferably, the method is applied in an electronic apparatus having at least a touch display screen which can sense a short distance gesture operation, and the amount of variation of input parameter includes at least one of the following items:

Amount of variation of the distance between the input contact points and the touch display screen; or Amount of variation of coordinates of the input contact points on parallel plane of the touch display screen.

Preferably, the amount of variation of input parameter being caused by change in spatial location between the operation body and the first region includes:

The amount of variation of the distance between the input contact points and the touch display screen is caused by change in the distances between the first operation body and the first region;

Amount of variation of coordinates of the input contact points on the parallel plane of the touch display screen is caused by movement of the operation on the parallel plane.

Preferably, controlling the operation object to respond to the amount of variation of input parameter in the second region includes:

Controlling the operation object to move away from the first region in the second region when the amount of variation of input parameter shows that the distance from the touch display screen becomes larger;

Controlling the operation object to move closer to the first region in the second region when the amount of variation of input parameter shows that the distance from the touch display screen becomes smaller;

Controlling the operation object to move according to the amount of variation of coordinates in the second region when the amount of variation of input parameter shows the amount of variation of the coordinates on the parallel plane of the touch display screen.

Preferably, controlling the operation object to respond to the amount of variation of input parameter in the second region further includes:

Controlling the operation object to select target pointed when the amount of variation of input parameter shows that the distance from the touch display screen becomes smaller and the time interval between the time of detecting the amount of variation of input parameter and the time of detecting the previous amount of variation of input parameter is larger than a preset time value.

Preferably, the amount of variation of input parameter includes:

Amount of variation of coordinates of the input contact points on the touch display screen.

Preferably, the amount of variation of input parameter being caused by change of spatial location between the operation body and the first region includes:

The amount of variation of coordinates of the input contact points on the touch display screen is caused by movement of the first operation body in the first region.

Preferably, controlling the operation object to respond to the amount of variation of input parameter in the second region includes:

Controlling the operation object to move according to the amount of variation of the coordinates in the second region.

Preferably, controlling the operation object to respond to the amount of variation of input parameter in the second region further includes:

Controlling the operation object to select target pointed when the amount of variation caused by double click of the first operation body in the first region is detected.

Preferably, controlling the operation object to respond to the amount of variation of input parameter in the second region further includes:

Controlling the operation object to select target pointed when the amount of variation caused by a second operation body that is different from the first operation body in the first region is detected.

Preferably, the preset trigger signal includes:

Signal generated by the input contact points which satisfy the preset condition;

The preset condition include at least one of the following items:

The input contact points constitute a preset shape or the number of the input contact points is larger than a preset number.

A control device applied in an electronic apparatus having at least a touch display screen, the control device includes:

A display module for displaying an operation object in a second region of the touch display screen after detecting a preset trigger signal in a first region of the touch display screen, the first region being not overlapped with the second region;

A sensing module for sensing amount of variation of input parameter in the first region, the amount of variation of input parameter being caused by the change in spatial location between a first operation body and the first region;

A control module for controlling the operation object to respond to the amount of variation of input parameter in the second region.

Preferably, the device is applied in an electronic apparatus having at least a touch display screen which can sense a short distance gesture operation, and the sensing module includes at least one of the following items:

A first sensing unit for sensing amount of variation of distance between the input contact point in the first region and the touch display screen, the amount of variation of distance between the input contact point and the touch display screen being caused by the change in the distance between the first operation body and the first region;

A second sensing unit for sensing amount of variation of coordinates of the input contact points in the first region on parallel plane of the touch display screen, the amount of variation of coordinates of the input contact points on the parallel plane of the touch display screen being caused by movement of the first operation body on the parallel plane.

Preferably, the control module include at least one of the following items:

A first control unit for controlling the operation object to move away from the first region in the second region when the amount of variation of input parameter shows that the distance from the touch display screen becomes larger;

A second control unit for controlling the operation object to move closer to the first region in the second region when the amount of variation of input parameter shows that the distance from the touch display screen becomes smaller;

A third control unit for controlling the operation object move according to the amount of variation of coordinates in the second region when the amount of variation of input parameter shows the amount of variation of the coordinates on the parallel plane of the touch display screen;

A fourth control unit for controlling the operation object to select target pointed when the amount of variation of input parameter shows that the distance from the touch display screen becomes smaller and the time interval between the time of detecting the amount of variation of input parameter and the time of detecting the previous amount of variation of input parameter is larger than a preset time value;

A fifth control unit for controlling the operation object to select target pointed when the amount of variation caused by a double click of the first operation body in the first region is detected;

A sixth control unit for controlling the operation object to select target pointed when the amount of variation caused by a second operation body that is different from the first operation body in the first region is detected.

Preferably, the sensing module includes:

A third sensing unit for sensing amount of variation of coordinates of the input contact points on the touch display screen, the amount of variation of coordinates of the input contact points on the touch display screen being cause by movement of the first operation body in the first region.

Preferably, the control module include at least one of the following items:

A seventh control unit for controlling the operation object to move by the amount of variation of coordinates in the second region;

A eighth control unit for controlling the operation object to select target pointed when the amount of variation caused by double click of the first operation body in the first region is detected;

A ninth control unit for controlling the operation object to select target pointed when the amount of variation caused by a second operation body that is different from the first operation body in the first region is detected.

The third embodiment of the present invention provide a control method and a control device, the operation object is displayed in the second region of the touch display screen after detecting trigger signal in the first region of the touch display screen, and the operation in the second region is controlled to respond to the amount of variation of input parameter within the corresponding first region. Since the first region and the second region aren't overlapped, when the control method and control device of the third embodiment of the present invention are applied in large area touch display screen, the operation object can be displayed in the target object response range according to the operation instruction input by the user in an area out of the target object response range, so that the operation object responds to the operation instruction input by the user. Thus, the user does not need to move to operate the target object at long distance, which facilitates the usage of the user.

Hereinafter, the control method and control device according to the third embodiment of the present invention are described detailed with reference to FIG. 9 to FIG. 16.

Figure 9:
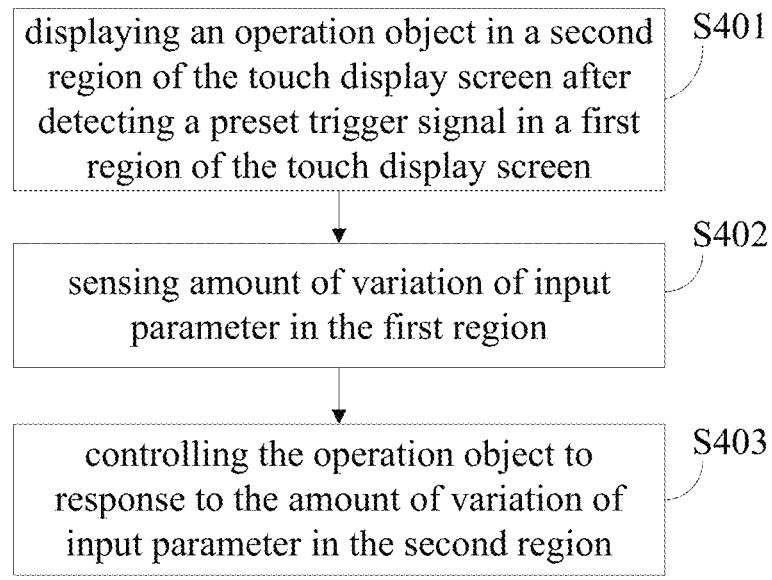
FIG. 9 is a flow chart of the control method disclosed in the third embodiment of the present invention.

The third embodiment of the present invention discloses a control method applied in an electronic apparatus having at least a touch display screen, as shown in FIG. 9, the control method includes:

S401: displaying an operation object in a second region of the touch display screen after detecting a preset trigger signal in a first region of the touch display screen, the first region being not overlapped with the second region;

S402: sensing amount of variation of input parameter in the first region, the amount of variation of input parameter being caused by the change in spatial location between a first operation body and the first region;

S403: controlling the operation object to respond to the amount of variation of input parameter in the second region.

Figure 10A:
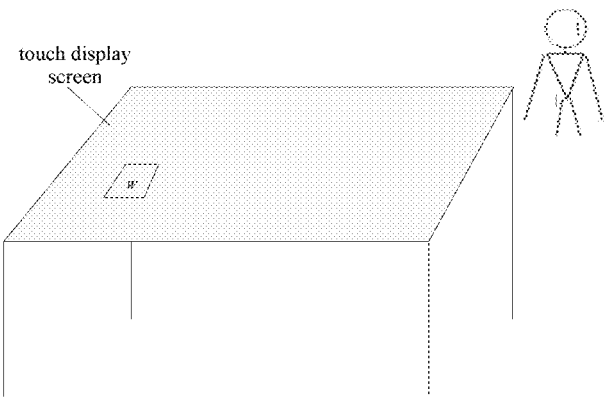
FIGS. 10A and 10B are a schematic diagrams of the usage scene of the control method disclosed in the third embodiment of the present invention and the conventional scene.

In the prior arts, since all of the target objects have a limited response range, for example, as shown in FIG. 10A, the response range of the WORD document is the area covered by the icon thereof. Thus, based on the current position of the user in FIG. 10A, if the user wants to operate the WORD document, the user needs to move to the position where he can touch the icon of the WORD document from the current position to operate the WORD document.

Figure 10B:
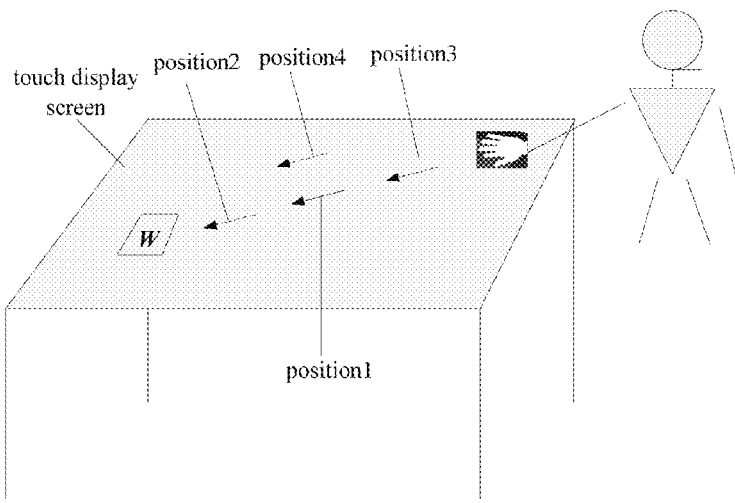

However, in the control method of the present embodiment, as shown in FIG. 10B, the user can input the operation gesture in a region where the user can operate at the current position (the first region), and the amount of variation of input parameter is responded using an arrow (operation object) in the region of the response region including the WORD document (the second region) after sensing the amount of variation of input parameter caused by the operation gesture of the user in the region (the first region). Thus, it can be seen that in the control method of the present embodiment, the user does not need to move when he can't reach the target object at the current position to operate the target object at the current position, so as to facilitate the usage of the user.

Figure 11:
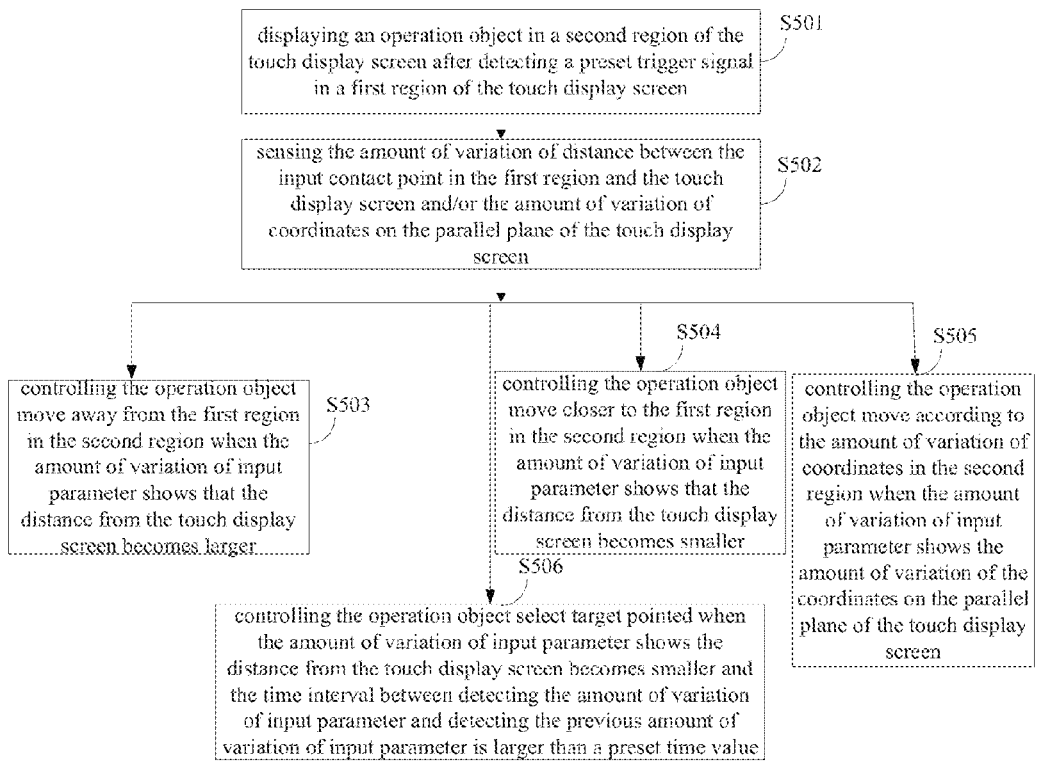
FIG. 11 is flow chart of another control method disclosed in the third embodiment of the present invention.

Another control method disclosed in the third embodiment of the present invention is applied in an electronic apparatus having at least a touch display screen which is able to sense a short distance gesture operation, as shown in FIG. 11, the control method of the present embodiment includes:

S501: displaying an operation object in a second region of the touch display screen after detecting a preset trigger signal in a first region of the touch display screen, the first region being not overlapped with the second region;

S502: sensing the amount of variation of distance between the input contact point in the first region and the touch display screen and/or the amount of variation of coordinates on the parallel plane of the touch display screen;

For the touch display screen of the short distance gesture operation, it can sense the non-contact gesture of the user, thus, the amount of variation of distance between the input contact point and the touch display screen can be caused by the change in spatial location between the first operation body and the touch display screen of the short distance gesture operation.

Figure 12A:
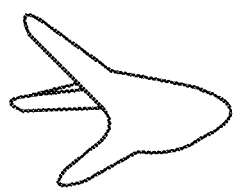
FIGS. 12A to 12C are schematic diagrams of a gesture causing amount of variations of input parameter in the control method disclosed in the third embodiment of the present invention.
Figure 12B:
Figure 12C:
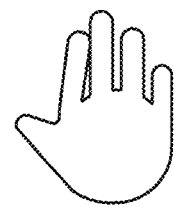

In the present embodiment, optionally, the amount of variation of distance between the input contact point and the touch display screen can be caused by the change in the distance between the first operation body and the first region. For example, as shown in FIG. 12A, when the forefinger of the user is as the first operation body, the forefinger uplift causes the distance from the first region becoming larger, and as shown in FIG. 12B, the forefinger putting down causes the distance from the first region becoming smaller. Further, the amount of variation of coordinates on the parallel plane of the touch display screen is caused by shift of the operation body on the parallel plane. For example, in FIG. 12C, the forefinger of the user moves rightwards, this causes the change of the coordinates on the parallel plane of the touch display screen.

In practical application, the amount of variation of the input contact point can be sensed by detecting change in capacity of the touch display screen, and can be sensed by sensing the change in electromagnetism of the touch display screen, and may also be sensed by detecting change in video of the operation body in the operational process, and there does not make any restriction here.

S503: controlling the operation object to move away from the first region in the second region when the amount of variation of input parameter shows that the distance from the touch display screen becomes larger;

For example, as shown in FIG. 10B, when the amount of variation of input parameter shows that the distance from the touch display screen becomes larger (caused by the gesture of FIG. 12A), the arrow is controlled to get closer to the WORD document in the second region, for example, move to position 2.

S504: controlling the operation object to move closer to the first region in the second region when the amount of variation of input parameter shows that the distance from the touch display screen becomes smaller;

For example, as shown in FIG. 10B, when the amount of variation of input parameter shows that the distance from the touch display screen becomes smaller (caused by the gesture of FIG. 12B), the arrow is controlled to get closer to the first region in the second region, for example, move to position 3.

S505: controlling the operation object to move according to the amount of variation of coordinates in the second region when the amount of variation of input parameter shows the amount of variation of the coordinates on the parallel plane of the touch display screen.

For example, as shown in FIG. 10B, when the amount of variation of input parameter shows amount of variation of coordinates on the parallel plane of the touch display screen (caused by the gesture of FIG. 12C), the arrow is controlled to move rightwards, for example, move to position 4.

S506: controlling the operation object select target pointed when the amount of variation of input parameter shows the distance from the touch display screen becomes smaller and the time interval between the time of detecting the amount of variation of input parameter and the time of detecting the previous amount of variation of input parameter is larger than a preset time value.

For example, after the user controls the arrow to reach the response region of the WORD document by changing the gesture in the first region, the user can put down the finger and hover for a period which is larger than a preset time value, and then the operation object is controlled to select the WORD document.

It needs to explain that, the manner of selecting the target object described in S506 is only a specific implementation mode, and other manner of selecting the target object may be used other than this. For example, the operation object is controlled to select target pointed when the amount of variation caused by a double click of the first operation body in the first region is detected.

Also for example, the operation object is controlled to select target pointed when the amount of variation caused by a second operation body that is different from the first operation body in the first region is detected. That is, the arrow is controlled to select the WORD document pointed when an input by a click of the middle finger in the first region is detected.

The control method and the electronic apparatus of present embodiment can implement operation of the target object in the second region by sensing the amount of variation of input parameter in the first region, that is, operate the target object using operation that is not within the response range of the target object. And, when the target objects are dispersed over different positions of the touch display screen, the user does not need to move back and forth to implement operation of any target objects.

Figure 13:
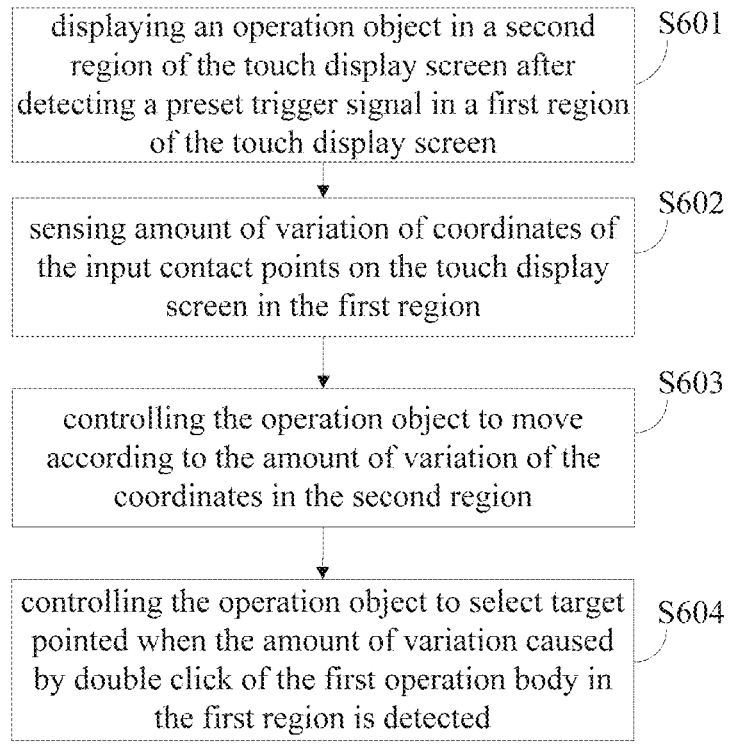
FIG. 13 is flow chart of yet another control method disclosed in the third embodiment of the present invention.

The third embodiment of the present invention discloses yet another control method applied in another electronic apparatus having at least a touch display screen, as shown in FIG. 13, the control method includes:

S601: displaying an operation object in a second region of the touch display screen after detecting a preset trigger signal in a first region of the touch display screen, the first region being not overlapped with the second region;

In the present embodiment, optionally, the preset condition may be: the input contact points constituting a preset shape, or the number of the input contact points being larger than a preset number, or both of the input contact points constituting a preset shape and the number thereof being larger than a preset number.

For example, the shape of the hand constituted by the input contact points can be as a trigger condition of displaying arrow in the second region, that is, the user can trigger the arrow displayed in the second region by putting one hand on the touch display screen. Also for example, the number of the input contact points being larger than 5 can be set as the trigger condition of displaying arrow in the second region, that is, the user can trigger displaying arrow in the second region by using five fingers to click the touch display screen or putting one hand on the touch display screen.

In the present embodiment, the purpose of setting the trigger condition of displaying operation object in the second region is to distinguish from a usual input operation carried out on the touch display screen to avoid disoperation.

S602: sensing amount of variation of coordinates of the input contact points on the touch display screen in the first region;

The amount of variation of coordinates of the input contact points on the touch display screen can be caused by a shift of the first operation body in the first region, optionally, in the present embodiment, the amount of variation of coordinates is caused by movement of the forefinger of the user in the first region.

Further, the movement of the first operation body in the first region may be the movement of the first operation body within the first region. For example, the forefinger of the user moves in the first region, such movement is implemented by a "roll" action of "leaving the first region—contacting with the first region—sliding n the first region" carried out by the forefinger cyclically.

S603: controlling the operation object to move according to the amount of variation of the coordinates in the second region;

S604: controlling the operation object to select target pointed when the amount of variation caused by a double click of the first operation body in the first region is detected.

For example, if the finger of the user "rolls" towards the WORD document, it causes a continue movement of the arrow to the WORD document; and when the middle finger of the user clicks in the first region, the WORD document is selected by using the arrow.

The control method of the present embodiment restricts the operation in the first region of the operation body within the first region, which also facilitate the usage of the user.

Figure 14:
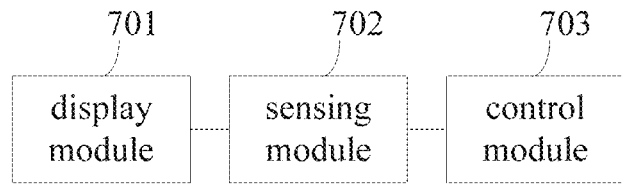
FIG. 14 is a schematic diagram of the structure of a control means disclosed in the third embodiment of the present invention.

Corresponding to the above-described embodiment of control method, the third embodiment of the present invention also discloses a control device applied in an electronic apparatus having at least a touch display screen, as shown in FIG. 14, the control device includes:

A display module 701 for displaying an operation object in a second region of the touch display screen after detecting a preset trigger signal in a first region of the touch display screen, the first region being not overlapped with the second region;

A sensing module 702 for sensing amount of variation of input parameter in the first region, the amount of variation of input parameter being caused by the change in spatial location between a first operation body and the first region;

A control module 703 for controlling the operation object to respond to the amount of variation of input parameter in the second region.

The control device of the present embodiment can display operation object within the response range of the target object according to operation instruction inputted out of the response range of the target object by the user, so as to make the operation object to respond to the operation instruction input by the user. Thus, the user does not need to move to operate the target object at long distance, which facilitates the usage of the user.

Figure 15:
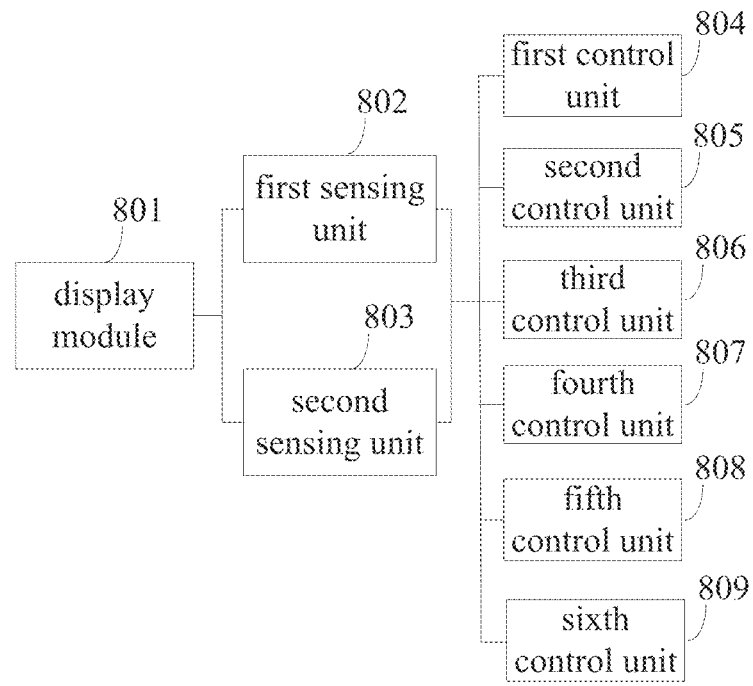
FIG. 15 is a schematic diagram of the structure of another control means disclosed in the third embodiment of the present invention.

The third embodiment of the present invention discloses yet another control device applied in an electronic apparatus having at least a touch display screen which is able to sense a short distance gesture operation, as shown in FIG. 15, the control device includes:

A display module 801 for displaying an operation object in a second region of the touch display screen after detecting a preset trigger signal in a first region of the touch display screen, the first region being not overlapped with the second region;

A first sensing unit 802 for sensing amount of variation of distance between the input contact point in the first region and the touch display screen, the amount of variation of distance between the input contact point and the touch display screen being caused by the change in the distance between the first operation body and the first region;

A second sensing unit 803 for sensing amount of variation of coordinates of the input contact points in the first region on parallel plane of the touch display screen, the amount of variation of coordinates of the input contact points on the parallel plane of the touch display screen being caused by the shift of the first operation body on the parallel plane.

A first control unit 804 for controlling the operation object to move away from the first region in the second region when the amount of variation of input parameter shows that the distance from the touch display screen becomes larger;

A second control unit 805 for controlling the operation object to move closer to the first region in the second region when the amount of variation of input parameter shows that the distance from the touch display screen becomes smaller;

A third control unit 806 for controlling the operation object to move according to the amount of variation of coordinates in the second region when the amount of variation of input parameter shows the amount of variation of the coordinates on the parallel plane of the touch display screen.

A fourth control unit 807 for controlling the operation object to select target pointed when the amount of variation of input parameter shows the distance from the touch display screen becomes smaller and the time interval between the time of detecting the amount of variation of input parameter and the time of detecting the previous amount of variation of input parameter is larger than a preset time value;

A fifth control unit 808 for controlling the operation object to select target pointed when the amount of variation caused by the double click of the first operation body in the first region is detected.

A sixth control unit 809 for controlling the operation object to select target pointed when the amount of variation caused by a second operation body that is different from the first operation body in the first region is detected.

Figure 16:
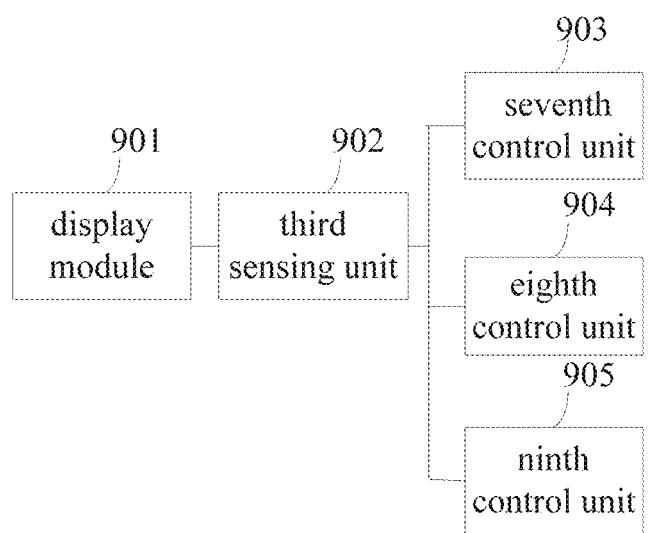
FIG. 16 is a schematic diagram of the structure of yet another control means disclosed in the third embodiment of the present invention.

The third embodiment of the present invention discloses still another control device applied in another electronic apparatus having at least a touch display screen, as shown in FIG. 16, the control device includes:

A display module 901 for displaying an operation object in a second region of the touch display screen after detecting a preset trigger signal in a first region of the touch display screen, the first region being not overlapped with the second region;

A third sensing unit 902 for sensing amount of variation of coordinates of the input contact points on the touch display screen, the amount of variation of coordinates of the input contact points on the touch display screen being cause by the shift of the first operation body in the first region;

A seventh control unit 903 for controlling the operation object to move by the amount of variation of coordinates in the second region;

An eighth control unit 904 for controlling the operation object to select target pointed when the amount of variation caused by the double click of the first operation body in the first region is detected.

A ninth control unit 905 for controlling the operation object to select target pointed when the amount of variation caused by a second operation body that is different from the first operation body in the first region is detected.

Here, those skilled in the art can understand, with respect to the operation processing method and the operation processing device according to the first embodiment and the second embodiment of the present invention, the control method and the control device according to the third embodiment of the present invention are suitable for relatively simple scene actually. That is, when the user only needs to operate such as move a certain object simply, he can use the control method and the control device according to the third embodiment of the present invention to operate the object. Therefore, at the time of applying the control method and the control device according to the third embodiment of the present invention, the first interactive interface and the second interactive interface as in the operation processing method and the operation processing device according to the first embodiment and the second embodiment of the present invention don't need to be displayed in the first region and the second region of the touch display screen, and not all of the operable objects in the above-described interactive interface needs to be displayed, but only a certain operable object that needs to be operated by the user needs to be displayed. Thus, as compared to the operation processing method and the operation processing device according to the first embodiment and the second embodiment of the present invention, though less functions are implemented, the control method and the control device according to the third embodiment of the present invention can occupy less hardware resource of the electronic apparatus, and thus may be more advantageous in some certain scenes.

On the other hand, in the operation processing method and the operation processing device according to the first embodiment and the second embodiment of the present invention, when a single object is operated, the control method and the control device according to the third embodiment of the present invention may be used as a specific manner of operating the single object. And, when the user wishes to operate the object more clearly or needs to operate a plurality of objects in the control method and the control device according to the third embodiment of the present invention, the interactive interface and the operable objects in the interactive interface may be displayed as in the operation processing method and the operation processing device according to the first embodiment and the second embodiment of the present invention.

That is, those skilled in the art can understand that the operation processing method and the operation processing device according to the first embodiment and the second embodiment of the present invention as well as the control method and the control device according to the third embodiment of the present invention may be used individually, or may be used in combination with each other.

When the operation processing method and the operation processing device according to the first embodiment and the second embodiment of the present invention are used individually, the operation processing method and the operation processing device according to the embodiments of the present invention may be configured as follows.

(1) An operation processing method applied in an electronic apparatus including a display unit in which a first interactive interface having a first size is displayed, the method includes:

Displaying a second interactive interface having a second size that is different from the first size in the display unit, and the first interactive interface having a mapping relation with the second interactive interface;

Detecting a first action executed by the user in the second interactive interface; and Executing a first operation in the first interactive interface according to the first action.

(2) The operation processing method according to the above (1), wherein, before the step of displaying the second interactive interface in the display unit, the method further includes:

Detecting a second action executed by the user to the electronic apparatus;

Deciding whether the second action satisfies a first condition; and

Displaying the second interactive interface in the display unit according to the second action if the second action satisfies the first condition.

(3) The operation processing method according to the above (2), wherein, the step of displaying the second interactive interface in the display unit according to the second action specifically includes:

Determining a display mode of the second interactive interface in the display unit according to the second action, the display mode including at least one of the following respective items: a display position, a display size and a speed of change in size; and Displaying the second interactive interface in the display unit according to the display mode.

(4) The operation processing method according to the above (1), wherein, the step of displaying the second interactive interface in the display unit specifically includes:

Zooming the first interactive interface according to the mapping relation; and

Displaying the zoomed first interactive interface in the display unit as the second interactive interface.

(5) The operation processing method according to the above (1), wherein, the step of displaying the second interactive interface in the display unit specifically includes:

Displaying a blank interactive interface in the display unit as the second interactive interface;

Detecting operable objects included in the first interactive interface;

Determining layout information of the operable objects in the first interactive interface; and Displaying virtual objects in the blank interactive interface according to the layout information, the virtual objects being mapped into the operable objects according to the mapping relation.

(6) The operation processing method according to the above (1), wherein, the step of detecting the first action executed by the user in the second interactive interface specifically includes:

Detecting interactive gesture executed by the user in the first interactive interface;

Determining first global coordinates of the interactive gesture in the first interactive interface;

Deciding whether at least a part of the interactive gesture is executed in the second interactive interface according to the first global coordinates;

Determining the interactive gesture as the first action if it decides that at least a part of the interactive gesture is executed in the second interactive interface; and Determining the interactive gesture as a third action and executing a second operation in the first interactive interface according to the third action if it decides that none of the part of the interactive gesture is executed in the second interactive interface.

(7) The operation processing method according to the above (6), wherein, the step of determining the interactive gesture as the first action specifically includes:

Deciding whether the interactive gesture is made to the second interactive interface itself;

Determining the interactive gesture as a fourth action and executing a third operation to the second interactive interface in the first interactive interface according to the fourth action if it decides that the interactive gesture is made to the second interactive interface itself; and Determining the interactive gesture as the first action if it decides that the interactive gesture is not made to the second interactive interface itself.

(8) The operation processing method according to the above (7), wherein, the third operation includes at least one of the following respective items:

Reducing the second interactive interface, magnifying the second interactive interface, moving the second interactive interface, refreshing the second interactive interface and closing the second interactive interface.

(9) The operation processing method according to the above (1), wherein, the step of executing the first operation in the first interactive interface according to the first action specifically includes:

Determining local coordinates of the first action in the second interactive interface;

Mapping the local coordinates into second global coordinates in the first interactive interface according to the mapping relation; and Executing the first operation in the first interactive interface according to the second global coordinates.

(10) The operation processing method according to the above (9), wherein, after the step of executing the first operation in the first interactive interface according to the second global coordinates, the method further includes:

Updating the display in the second interactive interface through a first response to the first operation in the first interactive interface according to the mapping relation.

(11) An operation processing device applied in an electronic apparatus including a display unit in which a first interactive interface having a first size is displayed, the operation processing device includes:

An interface display unit for displaying a second interactive interface having a second size that is different from the first size in the display unit, and the first interactive interface having a mapping relation with the second interactive interface;

A first detecting unit for detecting a first action executed by the user in the second interactive interface; and An operation executing unit for executing the first operation in the first interactive interface according to the first action.

(12) The operation processing device according to the above (11), further includes:

A second detecting unit for detecting a second action executed by the user to the electronic apparatus and deciding whether the second action satisfies a first condition before displaying the second interactive interface in the display unit by the interface display unit, and notifying the interface display unit of displaying the second interactive interface in the display unit according to the second action if the second action satisfies the first condition.

(13) The operation processing device according to the above (12), wherein, the interface display unit determines a display mode of the second interactive interface in the display unit according to the second action and display the second interactive interface in the display unit according to the display mode, the display mode include at least one of the following respective items: a display position, a display size and a speed of change in size.

(14) The operation processing device according to the above (11), wherein, the interface display unit zooms the first interactive interface according to the mapping relation, and displays the zoomed first interactive interface in the display unit as the second interactive interface.

(15) The operation processing device according to the above (11), wherein, the interface display unit displays a blank interactive interface in the display unit as the second interactive interface, and detects an operable object included in the first interactive interface, determines layout information of the operable object in the first interactive interface, and displays virtual objects in the blank interactive interface according to the layout information, here, the virtual objects are mapped into the operable objects according to the mapping relation.

(16) The operation processing device according to the above (11), wherein, the first detecting unit detects an interactive gesture executed by the user in the first interactive interface, determines first global coordinates of the interactive gesture in the first interactive interface, decides whether at least a part of the interactive gesture is executed in the second interactive interface according to the first global coordinates, determines the interactive gesture as the first action if it decides that at least a part of the interactive gesture is executed in the second interactive interface, and determines the interactive gesture as a third action if it decides that none of the part of the interactive gesture is executed in the second interactive interface, and notifies the operation executing unit of executing the second operation in the first interactive interface according to the third action.

(17) The operation processing device according to the above (16), wherein, the first detecting unit decides whether the interactive gesture is made to the second interactive interface itself, determines the interactive gesture as the fourth action and notifies the operation executing unit of executing a third operation to the second interactive interface in the first interactive interface according to the fourth action if it decides that the interactive gesture is made to the second interactive interface itself, and determines the interactive gesture as the first action if it decides that the interactive gesture is not made to the second interactive interface itself.

(18) The operation processing device according to the above (17), wherein, the third operation includes at least one of the following respective items:

Reducing the second interactive interface, magnifying the second interactive interface, moving the second interactive interface, refreshing the second interactive interface and closing the second interactive interface.

(19) The operation processing device according to the above (11), wherein, the operation executing unit determines local coordinates of the first action in the second interactive interface, maps the local coordinates into second global coordinates in the first interactive interface according to the mapping relation, and executes the first operation in the first interactive interface according to the second global coordinates.

(20) The operation processing device according to the above (19), further includes:

A display updating unit for updating the display of the second interactive interface by a first response to the first operation in the first interactive interface according to the mapping relation after the operation executing unit executing the first operation in the first interactive interface according to the second global coordinates.

When the operation processing method and the operation processing device according to the first embodiment and the second embodiment of the present invention as well as the control method and the control device according to the third embodiment of the present invention are applied in combination with each other, the operation processing method and the operation processing device according to the embodiments of the present invention can be configured as follows.

(21) The operation processing method according to the any one of the above (1) to (10), wherein, the display unit is a touch display screen, and the operation processing method further includes after displaying the second interactive interface:

Displaying an operation object in the first interactive interface after detecting a preset trigger signal in the second interactive interface;

Detecting the first action executed by the user in the second interactive interface is specifically:

Sensing amount of variation of input parameter in the second interactive interface, the amount of variation of input parameter being caused by change in spatial location between a first operation body and the second interactive interface; and Executing the first operation in the first interactive interface according to the first action is specifically:

Controlling the operation object to respond to the amount of variation of input parameter in the first interactive interface.

(22) The operation processing method according to the above (21), wherein, the touch display screen is at least the touch display screen which is able to sense a short distance gesture operation, and the amount of variation of input parameter includes at least one of the following items:

Amount of variation of distance between input contact points and the touch display screen; or Amount of variation of coordinates of the input contact points on parallel plane of the touch display screen.

(23) The operation processing method according to the above (22), wherein, the amount of variation of input parameter being caused by the change in the spatial location between the first operation body and the second interactive interface specifically includes:

The amount of variation of the distance between the input contact points and the touch display screen being caused by the change in the distance between the first operation body and the second interactive interface;

Amount of variation of coordinates of the input contact points on the parallel plane of the touch display screen being caused by movement of the first operation body on the parallel plane.

(24) The operation processing method according to any one of the above (21) to (23), wherein, controlling the operation object to respond to the amount of variation of input parameter in the first interactive interface specifically includes:

Controlling the operation object to move away from the second interactive interface in the first interactive interface when the amount of variation of input parameter shows that the distance from the touch display screen becomes larger;

Controlling the operation object to move closer to the second interactive interface in the first interactive interface when the amount of variation of input parameter shows that the distance from the touch display screen becomes smaller;

Controlling the operation object to move according to the amount of variation of coordinates in the first interactive interface when the amount of variation of input parameter shows the amount of variation of the coordinates on the parallel plane of the touch display screen.

(25) The operation processing method according to the above (24), wherein, controlling the operation object to respond to the amount of variation of input parameter in the first interactive interface further includes:

Controlling the operation object to select target pointed when the amount of variation of input parameter shows that the distance from the touch display screen becomes smaller and the time interval between the time of detecting the amount of variation of input parameter and the time of detecting the previous amount of variation of input parameter is larger than a preset time value.

(26) The operation processing method according to the above (21), wherein, the amount of variation of input parameter specifically includes:

Amount of variation of coordinates of the input contact points on the touch display screen.

(27) The operation processing method according to the above (26), wherein, the amount of variation of input parameter being caused by the change in the spatial location between the first operation body and the second interactive interface specifically includes:

Amount of variation of coordinates of the input contact points on the second interactive interface of the touch display screen being caused by the movement of the first operation body on the second interactive interface.

(28) The operation processing method according to the above (21), (26) or (27), wherein, controlling the operation object to respond to the amount of variation of input parameter in the first interactive interface specifically includes:

Controlling the operation object to move according to the amount of variation of the coordinates in the first interactive interface.

(29) The operation processing method according to the above (22) or (27), wherein, controlling the operation object to respond to the amount of variation of input parameter in the first interactive interface further includes:

Controlling the operation object to select target pointed when the amount of variation caused by a double click of the first operation body in the second interactive interface is detected.

(30) The operation processing method according to the above (22) or (27), wherein, controlling the operation object to respond to the amount of variation of input parameter in the first interactive interface further includes:

Controlling the operation object to select target pointed when the amount of variation caused by a second operation body that is different from the first operation body in the second interactive interface is detected.

(31) The operation processing method according to the above (21), wherein, the preset trigger signal specifically includes:

Signal generated by the input contact points which satisfy the preset condition;

The preset condition include at least one of the following items:

The input contact points constitute a preset shape or the number of the input contact points is larger than a preset number.

(32) The operation processing device according to any one of the above (11) to (20), wherein, the display unit is a touch display screen and the operation processing device further includes:

A display module for displaying an operation object in the first interactive interface of the touch display screen after detecting a preset trigger signal in the second interactive interface of the touch display screen;

Wherein, the first detecting unit is specifically for sensing the amount of variation of input parameter in the second interactive interface, and the amount of variation of input parameter is caused by change in spatial location between the first operation body and the second interactive interface;

The control executing unit is specifically for controlling the operation object to respond to the amount of variation of input parameter in the first interactive interface.

(33) The operation processing device according to the above (32), wherein, the touch display screen is at least the touch display screen which is able to a sense short distance gesture operation, and the first detecting unit includes at least one of the following units:

A first sensing unit for sensing amount of variation of distance between the input contact point in the second interactive interface and the touch display screen, the amount of variation of distance between the input contact point and the touch display screen being caused by the change in distance between the first operation body and the second interactive interface;

A second sensing unit for sensing amount of variation of coordinates of the input contact points in the second interactive interface on parallel plane of the touch display screen, the amount of variation of coordinates of the input contact points on the parallel plane of the touch display screen being caused by movement of the first operation body on the parallel plane.

(34) The operation processing device according to the above (32) or (33), wherein, the operation executing unit includes at least one of the following units:

A first control unit for controlling the operation object to move away from the second interactive interface in the first interactive interface when the amount of variation of input parameter shows that the distance from the touch display screen becomes larger;

A second control unit for controlling the operation object to move closer to the second interactive interface in the first interactive interface when the amount of variation of input parameter shows that the distance from the touch display screen becomes smaller;

A third control unit for controlling the operation object to move according to the amount of variation of coordinates in the first interactive interface when the amount of variation of input parameter shows the amount of variation of the coordinates on the parallel plane of the touch display screen;

A fourth control unit for controlling the operation object to select target pointed when the amount of variation of input parameter shows that the distance from the touch display screen becomes smaller and the time interval between the time of detecting the amount of variation of input parameter and the time of detecting the previous amount of variation of input parameter is larger than a preset time value;

A fifth control unit for controlling the operation object to select target pointed when the amount of variation caused by a double click of the first operation body in the second interactive interface is detected;

A sixth control unit for controlling the operation object to select target pointed when the amount of variation caused by a second operation body that is different from the first operation body in the second interactive interface is detected.

(35) The operation processing device according to the above (32), wherein, the first detecting unit includes:

A third sensing unit for sensing amount of variation of coordinates of the input contact points on the touch display screen, the amount of variation of coordinates of the input contact points on the touch display screen being cause by movement of the first operation body in the first region.

(36) The operation processing device according to the above (35), wherein, the operation executing unit includes at least one of the following units:

A seventh control unit for controlling the operation object to move by the amount of variation of coordinates in the first interactive interface;

A eighth control unit for controlling the operation object to select target pointed when the amount of variation caused by a double click of the first operation body in the second interactive interface is detected;

A ninth control unit for controlling the operation object to select target pointed when the amount of variation caused by a second operation body that is different from the first operation body in the second interactive interface is detected.

Further, when the control method and the control device according to the third embodiment of the present invention are applied individually, the control method and the control device according to the embodiments of the present invention can be configured as follows.

(37) A control method applied in an electronic apparatus having at least a touch display screen, wherein, the control method includes:

Displaying an operation object in a second region of the touch display screen after detecting a preset trigger signal in a first region of the touch display screen, the first region being not overlapped with the second region;

Sensing amount of variation of input parameter in the first region, the amount of variation of input parameter being caused by change in spatial location between a first operation body and the first region;

Controlling the operation object to respond to the amount of variation of input parameter in the second region.

(38) The control method according to the above (37), the control method is applied in the electronic apparatus having at least the touch display screen which is able to sense a short distance gesture operation, wherein, the amount of variation of input parameter includes at least one of the following items:

Amount of variation of distance between input contact points and the touch display screen; or Amount of variation of coordinates of the input contact points on parallel plane of the touch display screen.

(39) The control method according to the above (38), wherein, the amount of variation of input parameter being caused by the change in the spatial location between the first operation body and the first region specifically includes:

The amount of variation of the distance between the input contact points and the touch display screen is caused by change in distance between the first operation body and the first region;

Amount of variation of coordinates of the input contact points on the parallel plane of the touch display screen being caused by movement of the first operation body on the parallel plane.

(40) The control method according to any one of the above (37) to (39), wherein, controlling the operation object to respond to the amount of variation of input parameter in the second region includes:

Controlling the operation object to move away from the first region in the second region when the amount of variation of input parameter shows that the distance from the touch display screen becomes larger;

Controlling the operation object to move closer to the first region in the second region when the amount of variation of input parameter shows that the distance from the touch display screen becomes smaller;

Controlling the operation object to move according to the amount of variation of coordinates in the second region when the amount of variation of input parameter shows the amount of variation of the coordinates on the parallel plane of the touch display screen.

(41) The control method according to the above (40), wherein, controlling the operation object to respond to the amount of variation of input parameter in the second region further includes:

Controlling the operation object to select target pointed when the amount of variation of input parameter shows that the distance from the touch display screen becomes smaller and the time interval between the time of detecting the amount of variation of input parameter and the time of detecting the previous amount of variation of input parameter is larger than a preset time value.

(42) The control method according to the above (37), wherein, the amount of variation of input parameter specifically includes:

Amount of variation of coordinates of the input contact points on the touch display screen.

(43) The control method according to the above (42), wherein, the amount of variation of input parameter being caused by the change in the spatial location between the first operation body and the first region specifically includes:

The amount of variation of coordinates of the input contact points on the touch display screen is caused by movement of the first operation body in the first region.

(44) The control method according to the above (37), (42) or (43), wherein, controlling the operation object to respond to the amount of variation of input parameter in the second region specifically includes:

Controlling the operation object to move according to the amount of variation of the coordinates in the second region.

(45) The control method according to the above (38) or (43), wherein, controlling the operation object to respond to the amount of variation of input parameter in the second region further includes:

Controlling the operation object to select target pointed when the amount of variation caused by a double click of the first operation body in the first region is detected.

(46) The control method according to the above (38) or (43), wherein, controlling the operation object to respond to the amount of variation of input parameter in the second region further includes:

Controlling the operation object to select target pointed when the amount of variation caused by a second operation body that is different from the first operation body in the first region is detected.

(47) The control method according to the above (37), wherein, the preset trigger signal specifically includes:

Signal generated by the input contact points which satisfy the preset condition;

The preset condition include at least one of the following items:

The input contact points constitute a preset shape or the number of the input contact points is larger than a preset number.

(48) A control device applied in an electronic apparatus having at least a touch display screen, wherein, the control device includes:

A display module for displaying an operation object in a second region of the touch display screen after detecting a preset trigger signal in a first region of the touch display screen, the first region being not overlapped with the second region;

A sensing module for sensing amount of variation of input parameter in the first region, the amount of variation of input parameter being caused by change in spatial location between a first operation body and the first region;

A control module for controlling the operation object to respond to the amount of variation of input parameter in the second region.

(49) The control device according to the above (48) which is applied in the electronic apparatus having at least the touch display screen which is able to sense a short distance gesture operation, wherein, the sensing module includes at least one of the following units:

A first sensing unit for sensing amount of variation of distance between input contact point in the first region and the touch display screen, the amount of variation of distance between the input contact point and the touch display screen being caused by change in distance between the first operation body and the first region;

A second sensing unit for sensing amount of variation of coordinates of the input contact points in the first region on parallel plane of the touch display screen, the amount of variation of coordinates of the input contact points on the parallel plane of the touch display screen being caused by movement of the first operation body on the parallel plane.

(50) The control device according to the above (48) or (49), wherein, the control module includes at least one of the following units:

A first control unit for controlling the operation object to move away from the first region in the second region when the amount of variation of input parameter shows that the distance from the touch display screen becomes larger;

A second control unit for controlling the operation object to move closer to the first region in the second region when the amount of variation of input parameter shows that the distance from the touch display screen becomes smaller;

A third control unit for controlling the operation object to move according to the amount of variation of coordinates in the second region when the amount of variation of input parameter shows the amount of variation of the coordinates on the parallel plane of the touch display screen;

A fourth control unit for controlling the operation object to select target pointed when the amount of variation of input parameter shows that the distance from the touch display screen becomes smaller and the time interval between the time of detecting the amount of variation of input parameter and the time of detecting the previous amount of variation of input parameter is larger than a preset time value;

A fifth control unit for controlling the operation object to select target pointed when the amount of variation caused by a double click of the first operation body in the first region is detected;

A sixth control unit for controlling the operation object to select target pointed when the amount of variation caused by a second operation body that is different from the first operation body in the first region is detected.

(51) The control device according to the above (48), wherein, the sensing module includes:

A third sensing unit for sensing amount of variation of coordinates of the input contact points on the touch display screen, the amount of variation of coordinates of the input contact points on the touch display screen being cause by movement of the first operation body in the first region.

(52) The control device according to the above (51), wherein, the control module includes at least one of the following units:

A seventh control unit for controlling the operation object to move by the amount of variation of coordinates in the second region;

A eighth control unit for controlling the operation object to select target pointed when the amount of variation caused by a double click of the first operation body in the first region is detected; and A ninth control unit for controlling the operation object to select target pointed when the amount of variation caused by a second operation body that is different from the first operation body in the first region is detected.

Further, the above (21) to (36) are described by taking incorporating the technical features of the control method and the control device according to the third embodiment of the present invention into the technical solutions of the operation processing method and the operation processing device according to the first embodiment and the second embodiment of the present invention as example, however, those skilled in the art can understand that, the technical features of the operation processing method and the operation processing device according to the first embodiment and the second embodiment of the present invention can be incorporated into the technical solutions of the control method and the control device according to the third embodiment of the present invention. In this case, the control method and the control device according to the embodiments of the present invention are configured as follows.

(53) The control method according to any one of the above (37) to (47), before displaying the operation object in the second region in the touch display screen, the control method further includes:

Displaying a first interactive interface having a first size in the second region, Displaying a second interactive interface having a second size that is different from the first size in the first region, and the first interactive interface having a mapping relation with the second interactive interface;

Sensing the amount of variation of input parameter in the first region is specifically:

Detecting a first action executed by the user in the second interactive interface; and Controlling the operation object to respond to the amount of variation of input parameter in the second region is specifically:

Executing a first operation in the first interactive interface according to the first action.

(54) The control method according to the above (53), wherein, before the step of displaying the second interactive interface in the first region, the control method further includes:

Detecting a second action executed by the user to the electronic apparatus;

Deciding whether the second action satisfies a first condition; and

Displaying the second interactive interface in the display unit according to the second action if the second action satisfies the first condition.

(55) The control method according to the above (54), wherein, the step of displaying the second interactive interface in the first region according to the second action specifically includes:

Determining a display mode of the second interactive interface in the display unit according to the second action, the display mode including at least one of the following respective items: a display position, a display size and a speed of change in size; and Displaying the second interactive interface in the display unit according to the display modes.

(56) The control method according to the above (53), wherein, the step of displaying the second interactive interface in the first region specifically includes:

Zooming the first interactive interface according to the mapping relation; and

Displaying the zoomed first interactive interface in the display unit as the second interactive interface.

(57) The control method according to the above (53), wherein, the step of displaying the second interactive interface in the first region specifically includes:

Displaying a blank interactive interface in the first region as the second interactive interface;

Detecting operable objects included in the first interactive interface;

Determining layout information of the operable objects in the first interactive interface; and Displaying virtual objects in the blank interactive interface according to the layout information, the virtual objects being mapped into the operable objects according to the mapping relation.

(58) The control method according to the above (53), wherein, the step of detecting the first action executed by the user in the second interactive interface specifically includes:

Detecting an interactive gesture executed by the user in the first interactive interface;

Determining first global coordinates of the interactive gesture in the first interactive interface;

Deciding whether at least a part of the interactive gesture is executed in the second interactive interface according to the first global coordinates;

Determining the interactive gesture as the first action if it decides that at least a part of the interactive gesture is executed in the second interactive interface; and Determining the interactive gesture as a third action and executing a second operation in the first interactive interface according to the third action if it decides that none of the part of the interactive gesture is executed in the second interactive interface.

(59) The control method according to the above (58), wherein, the step of determining the interactive gesture as the first action specifically includes:

Deciding whether the interactive gesture is made to the second interactive interface itself;

Determining the interactive gesture as a fourth action and executing a third operation to the second interactive interface in the first interactive interface according to the fourth action if it decides that the interactive gesture is made to the second interactive interface itself; and Determining the interactive gesture as the first action if it decides that the interactive gesture is not made to the second interactive interface itself.

(60) The control method according to the above (59), wherein, the third operation includes at least one of the following respective items:

Reducing the second interactive interface, magnifying the second interactive interface, moving the second interactive interface, refreshing the second interactive interface and closing the second interactive interface.

(61) The control method according to the above (53), wherein, the step of executing the first operation in the first interactive interface according to the first action specifically includes:

Determining local coordinates of the first action in the second interactive interface;

Mapping the local coordinates into second global coordinates in the first interactive interface according to the mapping relation; and Executing the first operation in the first interactive interface according to the second global coordinates.

(62) The control method according to the above (61), wherein, after the step of executing the first operation in the first interactive interface according to the second global coordinates, the control method further includes:

Updating the display in the second interactive interface through a first response to the first operation in the first interactive interface according to the mapping relation.

(63) The control device according to any one of the above (48) to (52), further includes:

An interface display unit for displaying a first interactive interface having a first size in the second region and displaying a second interactive interface having a second size which is different from the first size in the first region, and the first interactive interface having a mapping relation with the second interactive interface;

The sensing module is specifically for detecting a first action executed by the user in the second interactive interface; and The control module is specifically for executing a first operation in the first interactive interface according to the first action.

(64) The control device according to the above (63), further includes:

A second detecting unit for detecting a second action executed by the user to the electronic apparatus and deciding whether the second action satisfies a first condition before displaying the second interactive interface in the first region by the interface display unit, and notifying the interface display unit of displaying the second interactive interface in the first region according to the second action if the second action satisfies the first condition.

(65) The control device according to the above (64), wherein, the interface the first region determines a display mode of the second interactive interface in the first region according to the second action and displays the second interactive interface in the first region according to the display mode, the display modes include at least one of the following respective items: a display position, a display size and a speed of change in size.

(66) The control device according to the above (63), wherein, the interface display unit zooms the first interactive interface according to the mapping relation, and displays the zoomed first interactive interface in the display unit as the second interactive interface.

(67) The control device according to the above (63), wherein, the interface display unit displays a blank interactive interface in the first region as the second interactive interface, and detects an operable object included in the first interactive interface, determines layout information of the operable object in the first interactive interface, and displays a virtual object in the blank interactive interface according to the layout information, here, the virtual object is mapped into the operable object according to the mapping relation.

(68) The control device according to the above (63), wherein, the first detecting unit detects an interactive gesture executed by the user in the first interactive interface, determines first global coordinates of the interactive gesture in the first interactive interface, decides whether at least a part of the interactive gesture is executed in the second interactive interface according to the first global coordinates, determines the interactive gesture as the first action if it decides that at least a part of the interactive gesture is executed in the second interactive interface, and determines the interactive gesture as a third action if it decides that none of the part of the interactive gesture is executed in the second interactive interface, and notifies the operation executing unit of executing the second operation in the first interactive interface according to the third action.

(69) The control device according to the above (68), wherein, the first detecting unit decides whether the interactive gesture is made to the second interactive interface itself, determines the interactive gesture as the fourth action and notifies the control module of executing a third operation to the second interactive interface in the first interactive interface according to the fourth action if it decides that the interactive gesture is made to the second interactive interface itself, and determines the interactive gesture as the first action if it decides that the interactive gesture is not made to the second interactive interface itself.

(70) The control device according to the above (69), wherein, the third operation includes at least one of the following respective items:

Reducing the second interactive interface, magnifying the second interactive interface, moving the second interactive interface, refreshing the second interactive interface and closing the second interactive interface.

(71) The control device according to the above (63), wherein, the control module determines local coordinates of the first action in the second interactive interface, maps the local coordinates into a second global coordinates in the first interactive interface according to the mapping relation, and executes the first operation in the first interactive interface according to the second global coordinates.

(72) The control device according to the above (71), further includes:

A display updating unit for updating display of the second interactive interface by a first response to the first operation in the first interactive interface according to the mapping relation after the control module executing the first operation in the first interactive interface according to the second global coordinates.

Here, those skilled in the art can understand that, other than the manners described above, the operation processing method and the operation processing device according to the first embodiment and the second embodiment of the present invention as well as the control method and the control device according to the third embodiment of the present invention can be applied in combination with each other in other manners, and the embodiments of the present invention do not intend to make any restriction thereto.

Each embodiment of the present invention is described detailed above. However, those skilled in the art should understand, these embodiments can be made various modifications, combination or sub-combination without departing from the principle and spirit of the present invention, and such modifications should fall into the range of the present invention.

Those skilled in the art should understand that, the embodiment of the present invention can be provided as a method, a system or a computer program product. Therefore, the present invention can adopt forms of full hardware embodiment, full software embodiment, or embodiment combining software and hardware aspects. And, the present invention can adopt form of one or more computer program product implemented on a computer usable storage medium (includes, but not limited to a magnetic disk storage, a CD-ROM, an optical memory or the like) including computer usable program code.

The present invention is described by referring to flow chart and/or block diagram of method, apparatus (system) and computer program product according to the embodiments of the present invention. It should understand that each flow and/or block in the flow chart and/or block diagram and the combination of the flow and/or block in the flow chart and/or block diagram can be implemented by computer program instruction. The computer program instruction can be provided to processors of a general purpose computer, a dedicated computer, an embedded processor or other programmable data processing apparatus to generate a machine, so that a device for implementing functions specified in one or more flow of the flow chart and/or one or more block of the block diagram is generated by the instruction executed by the processor of the computer or other programmable.

The computer program instruction can also be stored computer readable storage which is able to direct the computer or other programmable data processing apparatus to operate in specific manners, so that the instruction stored in the computer readable storage generates manufactured article including commander equipment, the commander equipment implements functions specified by one or more flow in the flow chart and/or one or more block in the block diagram.

The computer program instruction can be loaded to computer or other programmable data processing apparatus, so that a series of operation steps are executed on the computer or other programmable apparatus to generate computer implemented process, so that the instruction executed on the computer or other programmable apparatus provide steps for implementing functions specified in one or more flow of the flow chart and/or one or more block of the block diagram.

Further, it needs to note that, in the specification, term "comprise", "include" and any other variation thereof intends to cover nonexclusive inclusion so that the procedure, the method, the product or the equipment including a series of elements not only includes these elements, but also include other elements which are not listed explicitly, or also include inherent elements of these procedure, method, product or equipment. In case that there is no more limitation, the element defined by statement "including one . . . " does not exclude that there is additional same element in the procedure, method, article or apparatus including the element.

Finally, it should note that, the above-described series of processing does not only include processing executed chronologically in an order mentioned here, and also include processing executed parallel or individually but not chronologically.

Though some embodiments of the present invention are shown and described, those skilled in the art should understand, these embodiments can be carried out various modifications without departing from the principle and spirit of the present invention, and such modifications should fall into the range of the present invention.

The invention claimed is:

1. An operation processing method applied in an electronic apparatus including a display unit in which a first interactive interface having a first size is displayed, the method comprises:
   displaying a second interactive interface having a second size that is different from the first size in the display unit, and the first interactive interface having a mapping relation with the second interactive interface;
   detecting a first action executed by the user in the second interactive interface; and
   executing a first operation in the first interactive interface according to the first action,
   wherein, displaying the second interactive interface in the display unit includes:

displaying a blank interactive interface in the display unit as the second interactive interface;
detecting operable objects included in the first interactive interface;
determining layout information of the operable objects in the first interactive interface; and
displaying virtual objects in the blank interactive interface according to the layout information, the virtual objects being expressed by geometric shape and text description, not a reduced display of the real operable objects, and being mapped into the operable objects according to the mapping relation,
wherein a background image or any inoperable object of the first interactive interface is not displayed in the second interactive interface.

2. The operation processing method according to claim 1, wherein, before displaying the second interactive interface in the display unit, the method further includes:
detecting a second action executed by the user to the electronic apparatus;
deciding whether the second action satisfies a first condition; and
displaying the second interactive interface in the display unit according to the second action if the second action satisfies the first condition.

3. The operation processing method according to claim 2, wherein, displaying the second interactive interface in the display unit according to the second action includes:
determining a display mode of the second interactive interface in the display unit according to the second action, the display mode including at least one of the following respective items: a display position, a display size and a speed of change in size; and
displaying the second interactive interface in the display unit according to the display mode.

4. The operation processing method according to claim 1, wherein, displaying the second interactive interface in the display unit includes:
zooming the first interactive interface according to the mapping relation; and
displaying the zoomed first interactive interface in the display unit as the second interactive interface.

5. The operation processing method according to claim 1, wherein, detecting the first action executed by the user in the second interactive interface includes:
detecting an interactive gesture executed by the user in the first interactive interface;
determining first global coordinates of the interactive gesture in the first interactive interface;
deciding whether at least a part of the interactive gesture is executed in the second interactive interface according to the first global coordinates;
determining the interactive gesture as the first action if it decides that at least a part of the interactive gesture is executed in the second interactive interface; and
determining the interactive gesture as a third action and executing a second operation in the first interactive interface according to the third action if it decides that none of the part of the interactive gesture is executed in the second interactive interface.

6. The operation processing method according to claim 5, wherein, determining the interactive gesture as the first action includes:
deciding whether the interactive gesture is made to the second interactive interface itself;
determining the interactive gesture as a fourth action and executing a third operation to the second interactive interface in the first interactive interface according to the fourth action if it decides that the interactive gesture is made to the second interactive interface itself; and
determining the interactive gesture as the first action if it decides that the interactive gesture is not made to the second interactive interface itself.

7. The operation processing method according to claim 6, wherein, the third operation includes at least one of the following respective items: reducing the second interactive interface, magnifying the second interactive interface, moving the second interactive interface, refreshing the second interactive interface, and closing the second interactive interface.

8. The operation processing method according to claim 1, wherein, executing the first operation in the first interactive interface according to the first action includes:
determining local coordinates of the first action in the second interactive interface;
mapping the local coordinates into second global coordinates in the first interactive interface according to the mapping relation; and
executing the first operation in the first interactive interface according to the second global coordinates.

9. The operation processing method according to claim 8, wherein, after executing the first operation in the first interactive interface according to the second global coordinates, the method further includes updating the display in the second interactive interface through a first response to the first operation in the first interactive interface according to the mapping relation.

10. The operation processing method according to claim 1, wherein, the display unit is a touch display screen, and further includes after displaying the second interactive interface:
displaying an operation object in the first interactive interface after detecting a preset trigger signal in the second interactive interface;
detecting the first action executed by the user in the second interactive interface is specifically:
sensing amount of variation of input parameter in the second interactive interface, the amount of variation of input parameter being caused by change in spatial location between a first operation body and the second interactive interface; and
executing the first operation in the first interactive interface according to the first action is specifically:
controlling the operation object to respond to the amount of variation of input parameter in the first interactive interface.

11. The operation processing method according to claim 10, wherein, the touch display screen is at least the touch display screen which is able to sense short distance gesture operation, and the amount of variation of input parameter includes at least one of the following items:
amount of variation of the distance between the input contact points and the touch display screen; or
amount of variation of coordinates of the input contact points on parallel plane of the touch display screen.

12. The operation processing method according to claim 11, wherein, the amount of variation of input parameter being caused by the change in the spatial location between the first operation body and the second interactive interface includes:
the amount of variation of the distance between the input contact points and the touch display screen being caused by change in the distances between the first operation body and the second interactive interface; and the amount of variation of coordinates of the input contact points on the parallel plane of the touch display screen being caused by movement of the first operation body on the parallel plane.

13. The operation processing method according to claim 10, wherein, controlling the operation object to respond to the amount of variation of input parameter in the first interactive interface includes:

controlling the operation object to move away from the second interactive interface in the first interactive interface when the amount of variation of input parameter shows that a distance from the touch display screen becomes larger;

controlling the operation object to move closer to the second interactive interface in the first interactive interface when the amount of variation of input parameter shows that the distance from the touch display screen becomes smaller; and controlling the operation object to move according to the amount of variation of coordinates in the first interactive interface when the amount of variation of input parameter shows the amount of variation of the coordinates on a parallel plane of the touch display screen.

14. The operation processing method according to claim 13, wherein, controlling the operation object to respond to the amount of variation of input parameter in the first interactive interface further includes controlling the operation object to select target pointed when the amount of variation of input parameter shows that the distance from the touch display screen becomes smaller and a time interval between a time of detecting the amount of variation of input parameter and a time of detecting a previous amount of variation of input parameter is larger than a preset time value.

15. The operation processing method according to claim 10, wherein, the amount of variation of input parameter includes:

amount of variation of coordinates of input contact points on the touch display screen; and the amount of variation of input parameter being caused by the change in the spatial location between the first operation body and the second interactive interface specifically includes:

amount of variation of coordinates of the input contact points on the second interactive interface of the touch display screen being caused by movement of the first operation body on the second interactive interface.

16. An operation processing device applied in an electronic apparatus including a display in which a first interactive interface having a first size is displayed, the operation processing device includes:

a first detector for detecting a first action executed by the user in a second interactive interface;

a processor; and a storage medium with computer program instructions recorded thereon, as being executed by the processor, the computer program instructions renders the processor to achieve the steps of:

an interface display step for displaying the second interactive interface having a second size that is different from the first size in the display unit, and the first interactive interface having a mapping relation with the second interactive interface; and an operation executing step for executing the first operation in the first interactive interface according to the first action, wherein, the interface display step is configured for:

displaying a blank interactive interface in the display unit as the second interactive interface;

detecting operable objects included in the first interactive interface;

determining layout information of the operable objects in the first interactive interface; and displaying virtual objects in the blank interactive interface according to the layout information, the virtual objects being expressed by geometric shape and text description, not a reduced display of the real operable objects, and being mapped into the operable objects according to the mapping relation, wherein a background image or any inoperable object of the first interactive interface is not displayed in the second interactive interface.

17. The operation processing device according to claim 16, wherein, the display is a touch display screen, and the computer program instructions renders the processor to achieve the steps of:

a display step for displaying an operation object in the first interactive interface of the touch display screen after detecting a preset trigger signal in the second interactive interface of the touch display screen;

wherein, the first detector is specifically for sensing the amount of variation of input parameter in the second interactive interface, and an amount of variation of input parameter is caused by change in spatial location between a first operation body and the second interactive interface;

a control executing step is specifically for controlling the operation object to respond to the amount of variation of input parameter in the first interactive interface.

18. A control method applied in an electronic apparatus having at least a touch display screen, wherein, the control method includes:

displaying an operation object in a second region of the touch display screen after detecting a preset trigger signal in a first region of the touch display screen, the first region being not overlapped with the second region;

sensing amount of variation of input parameter in the first region, the amount of variation of input parameter being caused by change in spatial location between a first operation body and the first region;

controlling the operation object to respond to the amount of variation of input parameter in the second region, before displaying the operation object in the second region in the touch display screen, the control method further includes:

displaying a first interactive interface having a first size in the second region, displaying a second interactive interface having a second size that is different from the first size in the first region, and the first interactive interface having a mapping relation with the second interactive interface;

sensing the amount of variation of input parameter in the first region includes:

detecting a first action executed by the user in the second interactive interface; and controlling the operation object to respond to the amount of variation of input parameter in the second region is specifically:

executing a first operation in the first interactive interface according to the first action wherein, displaying the second interactive interface in the second region includes:

displaying a blank interactive interface in the second region as the second interactive interface;

detecting operable objects included in the first interactive interface;

determining layout information of the operable objects in the first interactive interface; and displaying virtual objects in the blank interactive interface according to the layout information, the virtual objects being expressed by geometric shape and text description, not a reduced display of the real operable objects, and being mapped into the operable objects according to the mapping relation, wherein a background image or any inoperable object of the first interactive interface is not displayed in the second interactive interface.

* * * * *